United States Patent
Oohashi et al.

(10) Patent No.: US 6,865,796 B1
(45) Date of Patent: Mar. 15, 2005

(54) METHOD OF MANUFACTURING A STATOR FOR AN ALTERNATOR WITH REDUCED CONDUCTOR PORTIONS

(75) Inventors: Atsushi Oohashi, Tokyo (JP); Yoshihito Asao, Tokyo (JP); Katsumi Adachi, Tokyo (JP); Takushi Takizawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 52 days.

(21) Appl. No.: 09/711,073

(22) Filed: Nov. 14, 2000

(30) Foreign Application Priority Data

Feb. 23, 2000 (JP) ........................................ 2000-046175

(51) Int. Cl.$^7$ ............................ H02K 15/00; H02K 3/34
(52) U.S. Cl. ............................ 29/596; 29/605; 29/732; 310/215; 242/432
(58) Field of Search ...................... 29/596, 598, 592.1, 29/825, 867, 564.4, 605, 732; 310/179, 180, 201, 198, 215; 81/9.51, 9.4; 242/432

(56) References Cited

U.S. PATENT DOCUMENTS

| | | | | |
|---|---|---|---|---|
| 1,822,261 A | * | 9/1931 | Apple | ......................... 310/201 |
| 1,834,926 A | | 12/1931 | Apple | |
| 1,917,482 A | * | 7/1933 | Apple | ......................... 310/201 |
| 3,364,801 A | * | 1/1968 | Johnston | ....................... 29/825 |
| 4,352,305 A | * | 10/1982 | Rodenbeck | ................. 81/9.51 |
| 4,739,643 A | | 4/1988 | Kuriyama et al. | |
| 5,210,928 A | * | 5/1993 | Seshita et al. | ................. 29/596 |
| 5,508,571 A | * | 4/1996 | Shafer | ......................... 310/179 |
| 5,778,512 A | * | 7/1998 | Ichikawa et al. | .............. 29/598 |
| 5,781,990 A | * | 7/1998 | Seidler et al. | ................. 29/825 |
| 5,936,326 A | * | 8/1999 | Umeda et al. | .............. 310/179 |
| 6,181,043 B1 | * | 1/2001 | Kusase et al. | .............. 310/201 |
| 2002/0041129 A1 | * | 4/2002 | Oohashi et al. | ............. 310/179 |
| 2002/0092152 A1 | * | 7/2002 | Asao et al. | .................... 29/596 |

FOREIGN PATENT DOCUMENTS

| | | |
|---|---|---|
| FR | 1 265 020 | 6/1961 |
| JP | 6-141496 | 5/1994 |
| JP | 7-44797 | 5/1995 |
| JP | 11-341730 | 12/1999 |

OTHER PUBLICATIONS

Patent Abstracts of Japan vol. 3, No. 60 (E–112), May 23, 1979–& JP 54–38501 A (Hitachi LTD), Mar. 23, 1979.
Patent Abstracts of Japan vol. 4, No. 52 (E–7), Apr. 18, 1980–& JP 55–023773 A (Hitachi LTD), Feb. 20, 1980.

* cited by examiner

*Primary Examiner*—Marc Jimenez
(74) *Attorney, Agent, or Firm*—Sughrue Mion, PLLC

(57) ABSTRACT

Coil members are obtained by forming width-reduced portions in a wire material over a predetermined longitudinal range generally centered on cutting positions, then removing an insulation coating from the width-reduced portions, and thereafter cutting the wire material at the width-reduced portions. Coil segments are prepared by bending the coil members into a general U shape. Then the coil segments are inserted into the slots in a stator core, and a stator is obtained by welding together the free end portions of the projecting coil segments.

16 Claims, 22 Drawing Sheets

METHOD OF MANUFACTURING A STATOR FOR AN ALTERNATOR WITH REDUCED CONDUCTOR PORTIONS

BACKGROUND OF THE INVENTION

1. Field of the Invention

The present invention relates to a stator for an alternator driven by an internal combustion engine, for example, and to a method for manufacturing the stator, and in particular, relates to a stator for an alternator and a method for the manufacture thereof in which the stator is provided with a stator coil constructed by installing coil wires having a flat cross section formed into a predetermined shape into a stator core, and welding together end portions of the coil wires.

2. Description of the Related Art

FIG. 38 is a cross section showing the construction of a generic alternator.

The conventional alternator includes: a Lundell-type rotor 7 mounted so as to rotate freely by means of a shaft 6 within a case 3 composed of an aluminum front bracket 1 and an aluminum rear bracket 2; and a stator 8 secured to the inner wall of the case 3 so as to cover the outer circumference of the rotor 7.

The shaft 6 is rotatably supported by the front bracket 1 and the rear bracket 2. A pulley 4 is secured to one end of the shaft 6 to enable rotational torque from an engine to be transmitted to the shaft 6 by means of a belt (not shown).

Slip rings 9 for supplying electric current to the rotor 7 are secured to the other end of the shaft 6, and a pair of brushes 10 are housed in a brush holder 11 and disposed within the case 3 so as to slide in contact with the slip rings 9. A regulator 18 for regulating the magnitude of an alternating voltage generated in the stator 8 is affixed by adhesive to a heat sink 17 attached to the brush holder 11. A rectifier 12 electrically connected to the stator 8 for converting the alternating voltage generated in the stator 8 into direct current is mounted within the case 3.

The rotor 7 includes: a rotor coil 13 for conducting electric current and generating magnetic flux; and a pair of pole cores 20, 21 disposed so as to cover the rotor coil 13, magnetic poles being formed in the pair of pole cores 20, 21 by the magnetic flux generated by the rotor coil 13. The pair of pole cores 20, 21 are made of iron, each has a plurality of claw-shaped magnetic poles 22, 23 projecting from an outer circumferential edge thereof spaced at even angular pitch circumferentially, and the pole cores 20, 21 are secured to the shaft 6 facing each other so that the claw-shaped magnetic poles 22, 23 intermesh. In addition, fans 5 are secured to both axial ends of the rotor 7.

The stator 8 includes: a stator core 15; and a stator coil 16 composed of wire wound around the stator core 15 and having coil end groups 16a and 16b extending from the axial ends of the stator core 15.

In an alternator constructed in this manner, current is supplied to the rotor coil 13 from a battery (not shown) by means of the brushes 10 and the slip rings 9, and magnetic flux is generated. The claw-shaped magnetic poles 22 of one pole core 20 are polarized with north-seeking (N) poles by the magnetic flux, and the claw-shaped magnetic poles 23 of the other pole core 21 are polarized with south-seeking (S) poles. At the same time, the rotational torque of the engine is transmitted to the shaft 6 by means of the belt and the pulley 4, and the rotor 7 is rotated. Thus, a rotating magnetic field is imparted to the stator coil 16 and electromotive force is generated in the stator coil 16. This alternating electromotive force is converted into direct current by means of the rectifier 12, its magnitude is regulated by the regulator 18, and the battery is recharged.

Next, the construction of a conventional stator 8 will be explained in detail with reference to FIGS. 39 and 40. FIG. 39 is a perspective showing a coil segment constituting part of a conventional stator coil, and FIG. 40 is a perspective of part of a conventional stator viewed from the front end.

As shown in FIG. 39, the coil segments 30 functioning as coil wires are formed into a predetermined shape by cutting insulated copper wire material having a flat cross section into predetermined lengths which constitute coil members 29 and applying a bending process to the short, cut coil members 29. More specifically, the coil segments 30 are composed of a pair of straight portions 30a in which the longitudinal direction of the cross sections of each are generally parallel to each other, and a turn portion 30b which connects the straight portions 30a in a general V shape in which the longitudinal direction of the cross section is twisted at approximately 180° at an apex portion, forming an overall U shape.

In FIG. 40, the stator core 15 is formed into a cylindrical shape, a number of teeth 15a having a generally rectangular cross-sectional shape are disposed at even angular pitch circumferentially so as to extend radially inwards, and slots 15b for housing the coil are formed between the teeth 15a. The grooves of the slots 15b are parallel to an axial direction and are open on an inner circumferential side. Insulating paper 19 is housed in each of the slots 15a. In this case, the rotor has 12 poles, and the stator 8 has thirty-six slots 15b, making the number of slots per pole per phase equal to one.

These coil segments 30 are inserted two at a time from a rear end of the stator core 15 into pairs of slots 15b three slots apart such that the height of the turn portions 30b is uniform. Thus, four straight portions 30a are housed in each of the slots 15b such that the longitudinal direction of the cross sections of the straight portions 30a are aligned in a radial direction so that the straight portions 30a line up in a row radially. Free end portions 30c of the coil segments 30 projecting from each of the slots 15b are each bent circumferentially in the vicinity of the end of the stator core 15, then the free end portions 30c are each additionally bent such that the longitudinal direction of the cross sections thereof are each aligned radially and the free end portions 30c are parallel to the axial direction. The free end portions 30c of coil segments 30 projecting from slots 15b three slots apart are stacked radially and welded together, constituting three winding phase groups having four turns in each phase. The stator coil 16 is prepared by connecting the three winding phase groups constructed in this manner into a Y connection, for example.

The turn portions 30b of the coil segments 30 in the rear-end coil end group 16b of the stator coil 16 are constructed so as to be arranged circumferentially so as to line up radially in two rows at the rear end of the stator core 15. On the other hand, the front-end coil end group 16a is constructed such that inner circumferential joint portions 31 formed by radially stacking and welding the free end portions 30c of the coil segments 30 projecting from the first position (hereinafter called the first address) from the inner circumferential side of the slots 15b and the free end portions 30c of the coil segments 30 projecting from the second position (hereinafter called the second address) from the inner circumferential side of the slots 15b three slots away, and outer circumferential joint portions 32 formed by radially stacking and welding the free end portions 30c of the coil segments 30 projecting from the third position (hereinafter called the third address) from the inner circumferential side of the slots 15b and the free end portions 30c of the coil segments 30 projecting from the fourth position (hereinafter called the fourth address) from the inner circumferential side of the slots 15b three slots away are arranged circumferentially so as to line up radially in two rows.

A method for manufacturing the conventional stator 8 will now be explained with reference to FIGS. 41 to 48.

First, flat insulated copper wire material is cut into predetermined lengths using a nipper or the like to obtain coil members 29, as shown in FIG. 41.

Then, coil segments 30 functioning as coil wires shown in FIG. 42 are obtained by forming a coil member 29 into a U shape by a bending process.

Then, the coil segments 30 are inserted two at a time into pairs of slots 15b three slots apart such that the height of the turn portions 30b is uniform. At this time, four straight portions 30a are housed in each slot 15b such that the longitudinal direction of the cross sections of the straight portions 30a are aligned in the radial direction so as to line up in a row radially. The free end portions 30c of the coil segments 30 projecting from each of the slots 15b are each bent circumferentially in the vicinity of the end of the stator core 15, then the free end portions 30c are each additionally bent such that the longitudinal direction of the cross sections thereof are each aligned radially and the free end portions 30c are parallel to the axial direction. Thus, the free end portions 30c of the two coil segments 30 projecting from the first and third addresses from the inner circumferential side of a slot 15b and the free end portions 30c of the two coil segments 30 projecting from the second and fourth addresses from the inner circumferential side of a slot 15b three slots away are lined up in the radial direction as shown in FIGS. 43 and 44.

Next, the ends of the four coil segments 30 are held by lining up clamping jigs 27 in a straight line and bringing the tips of the jigs 27 together, as shown in FIGS. 45 and 46. Then, the free end portions 30c of the two coil segments 30 on the inner circumferential side are fused and joined together by tungsten-inert gas (TIG) welding using an arc. The free end portions 30c of the two coil segments 30 on the outer circumferential side are fused and joined together in the same way by TIG welding using an arc. Thus, inner circumferential joint portions 31 and outer circumferential joint portions 32 are obtained as shown in FIGS. 47 and 48. The three winding phase groups having four turns in each phase are obtained by welding each of the free end portions 30c together. Moreover, heat generated during welding is transferred through the jigs 27 to a radiating jig 28 and radiated to prevent the coating on the coil segments 30 from being burned.

The stator coil 16 is prepared by connecting the three winding phase groups prepared in this manner into a Y connection, for example.

In this conventional stator for an alternator, short coil members 29 obtained by cutting wire material using a nipper or the like, are formed into U-shaped coil segments 30 by a bending process. As shown in FIG. 41, bulges A and burrs B caused by cutting arise on side portions of the cross sections of these coil members 29. Because the bulges A and burrs B extend beyond the profile of the coil members 29, when the coil segments 30 are being inserted into the slots 15b, the bulges A catch and make it difficult to insert the coil into the slots, and the burrs B damage the insulating paper 19 giving rise to insulation defects. Thus, one problem has been reduced productivity and reliability.

Because the insulation coating on the free end portions 30c of the coil segments 30 is not removed, welding deteriorates, giving rise to dislodgement of the joint portions due to vibrations from the engine, etc., causing problems which reduce reliability.

Because the outer dimension of the free end portions 30c of the coil segments 30 is not reduced, the free end portions 30c which are joined in the coil end group 16a are arranged in close contact in one row radially, leaving little space for welding. As a result, when welding the free end portions 30c of the two coil segments 30 on the inner circumferential side, for example, there is a risk that the heat of welding will be transferred to the free end portions 30c of the coil segments 30 on the outer circumferential side and weld them to the free end portions 30c on the outer circumferential side as well, reducing productivity. In addition, because it is difficult to concentrate the arc on the interface between the free end portions 30c of the two coil segments 30 being welded and the fused surface area is reduced, sufficient weld strength cannot be obtained, giving rise to dislodgment of the joint portions due to vibrations from the engine, etc., thus causing problems which reduce reliability. Furthermore, electrical resistance is increased in the joint portions, increasing the amount of heat generated by the output current during power generation, causing reduced output due to temperature increases.

Furthermore, if welding time is increased in order to ensure sufficient fused surface area, the weld bead formed on the joint portion becomes too large, which later results in the occurrence of layer shorts due to vibration, thus reducing reliability.

SUMMARY OF THE INVENTION

The present invention aims to solve the above problems, and an object of the present invention is to provide a stator for an alternator and a method of manufacturing the stator enabling the achievement of increased reliability, and improved productivity by forming coil members by forming a reduced outer portion and then cutting the wire material at the reduced outer portion.

In order to achieve the above object, according to one aspect of the present invention, there is provided a method for manufacturing a stator for an alternator, the method including:

forming coil members by cutting wire material into predetermined lengths, the wire material being composed of an electrical conductor having a flat cross section coated with an insulation coating;

forming coil wires of a predetermined shape by subjecting the coil members to a bending process;

installing a predetermined number of the coil wires into a stator core; and forming a winding group having a predetermined number of turns by welding together end portions of each of the coil wires installed in the stator core, the method further including:

forming a reduced outer portion over a predetermined longitudinal range generally centered on each of the cutting positions on the wire material.

According to another aspect of the present invention, there is provided a stator for an alternator, the stator including:

a cylindrical stator core in which a number of slots having grooves aligned axially are disposed parallel to each other circumferentially so as to be open on an inner circumferential side; and a stator coil constructed by welding together a number of end portions of coil wires having a flat cross section coated with an insulation coating, the stator coil being wound so as to fold back outside the slots at axial end surfaces of the stator core so as to alternately occupy an inner and an outer layer in a slot depth direction within the slots at intervals of a predetermined number of slots, wherein an outer dimension of each of the end portions of the coil wires is reduced compared to other portions of the coil wire.

DETAILED DESCRIPTION OF THE PREFERRED EMBODIMENTS

The preferred embodiments of the present invention will now be explained with reference to the drawings.

Embodiment 1

Figure 1:
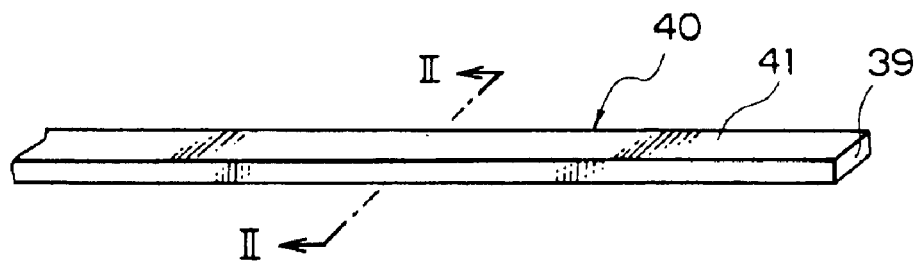
FIG. 1 is a perspective showing wire material used in a stator coil of a stator for an alternator according to Embodiment 1 of the present invention.
Figure 2:
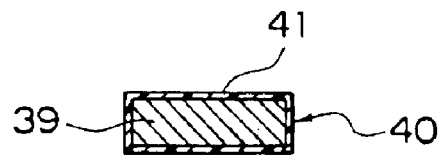
FIG. 2 is a cross section taken along line II—II in FIG. 1.
Figure 3:
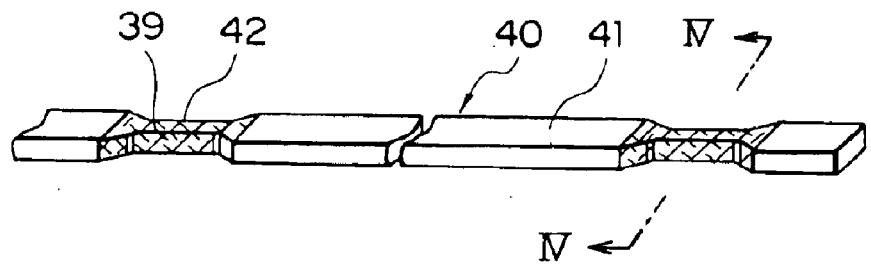
FIG. 3 is a perspective showing reduced outer portions formed in the wire material in a method for manufacturing the stator for an alternator according to Embodiment 1 of the present invention.
Figure 4:
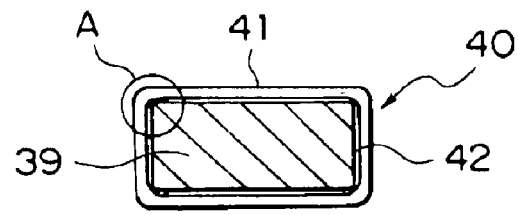
FIG. 4 is a cross section taken along line IV—IV in FIG. 3.
Figure 5:
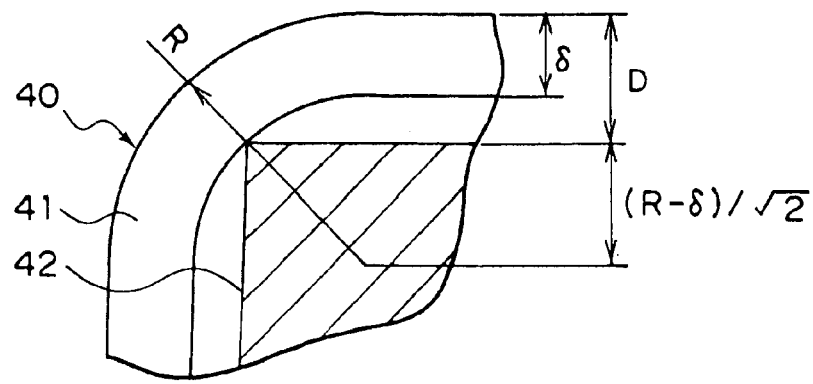
FIG. 5 is an enlarged view of portion A in FIG. 4.
Figure 6:
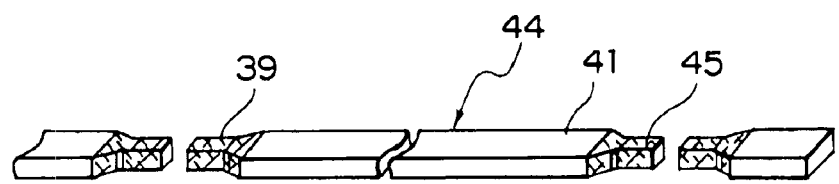
FIG. 6 is a perspective showing coil members formed by cutting the wire material in the method for manufacturing the stator for an alternator according to Embodiment 1 of the present invention.
Figure 7:
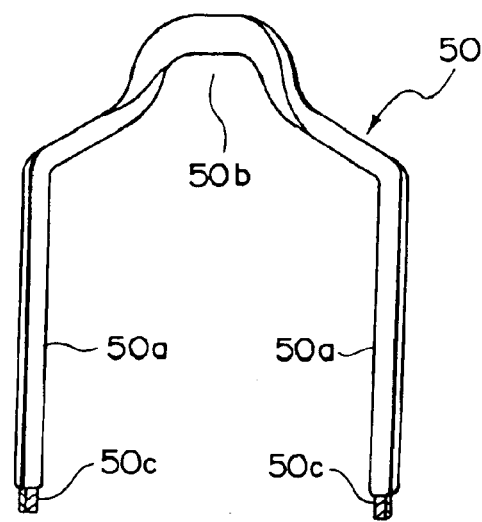
FIG. 7 is a perspective showing a coil segment formed by applying a bending process to a coil member in the method for manufacturing the stator for an alternator according to Embodiment 1 of the present invention.
Figure 8:
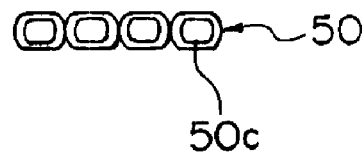
FIG. 8 is an end elevation explaining the arrangement of free end portions of coil segments inserted into a stator core in the method for manufacturing the stator for an alternator according to Embodiment 1 of the present invention.
Figure 9:
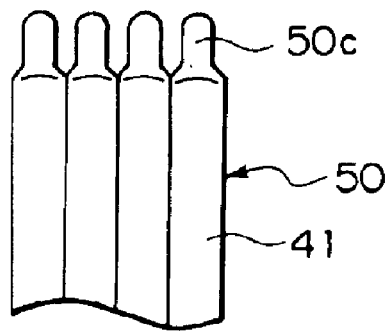
FIG. 9 is a side elevation explaining the arrangement of free end portions of coil segments inserted into the stator core in the method for manufacturing the stator for an alternator according to Embodiment 1 of the present invention.
Figure 10:
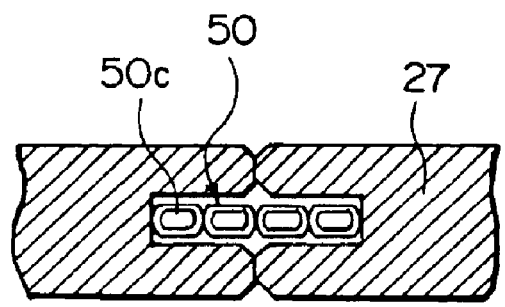
FIG. 10 is an end elevation explaining welding of the free end portions of coil segments in the method for manufacturing the stator for an alternator according to Embodiment 1 of the present invention.
Figure 11:
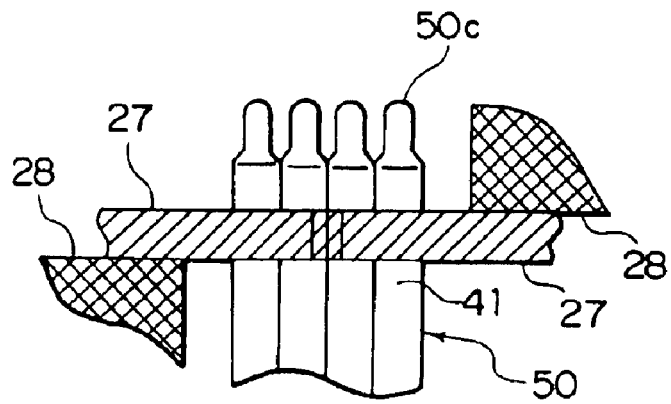
FIG. 11 is a side elevation explaining welding of the free end portions of coil segments in the method for manufacturing the stator for an alternator according to Embodiment 1 of the present invention.
Figure 12:
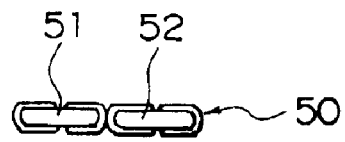
FIG. 12 is an end elevation explaining the welded state of the free end portions of coil segments in the method for manufacturing the stator for an alternator according to Embodiment 1 of the present invention.
Figure 13:
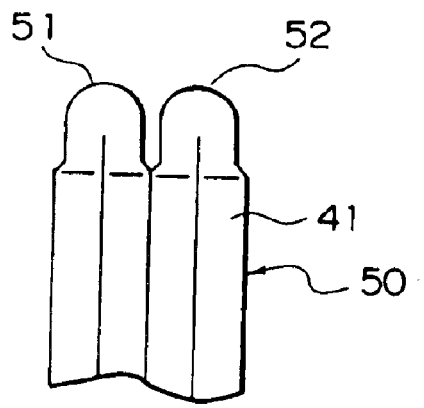
FIG. 13 is a side elevation explaining the welded state of the free end portions of coil segments in the method for manufacturing the stator for an alternator according to Embodiment 1 of the present invention.
Figure 14:
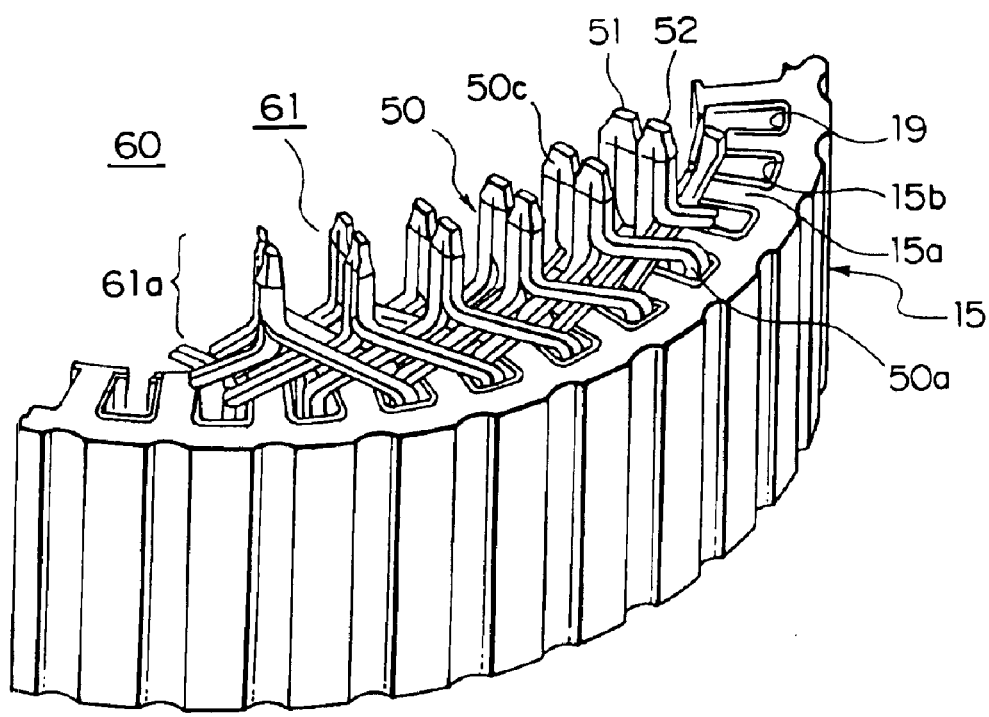
FIG. 14 is a perspective showing part of a front end of the stator manufactured by the method for manufacturing the stator for an alternator according to Embodiment 1 of the present invention.

FIG. 1 is a perspective showing wire material used in a stator coil of a stator for an alternator according to Embodiment 1 of the present invention, FIG. 2 is a cross section taken along line II—II in FIG. 1, FIG. 3 is a perspective showing reduced outer portions formed in the wire material in a method for manufacturing the stator for an alternator according to Embodiment 1 of the present invention, FIG. 4 is a cross section taken along line IV—IV in FIG. 3, FIG. 5 is an enlargement of portion A in FIG. 4, FIG. 6 is a perspective showing coil members formed by cutting the wire material in the method for manufacturing the stator for an alternator according to Embodiment 1 of the present invention, FIG. 7 is a perspective showing a coil segment formed by applying a bending process to a coil member in the method for manufacturing the stator for an alternator according to Embodiment 1 of the present invention, FIGS. 8 and 9 are an end elevation and a side elevation, respectively, explaining the arrangement of free end portions of coil segments inserted into a stator core in the method for manufacturing the stator for an alternator according to Embodiment 1 of the present invention, FIGS. 10 and 11 are an end elevation and a side elevation, respectively, explaining welding of the free end portions of coil segments in the method for manufacturing the stator for an alternator according to Embodiment 1 of the present invention, FIGS. 12 and 13 are an end elevation and a side elevation, respectively, explaining the welded state of free end portions of coil segments in the method for manufacturing the stator for an alternator according to Embodiment 1 of the present invention, and FIG. 14 is a perspective showing part of a front end of the stator manufactured by the method for manufacturing the stator for an alternator according to Embodiment 1 of the present invention.

The method for manufacturing a stator according to Embodiment 1 will now be explained with reference to FIGS. 1 to 13.

First, as shown in FIGS. 1 and 2, a wire material 40 is prepared by coating a flat electrical conductor 39 made of copper or the like having a rectangular cross section with an insulation coating 41. For example, a wire material 40 in which the width of the electrical conductor 39 is 2.5 mm, the thickness is 1.5 mm, the thickness of the insulation coating 41 is 0.4 mm, and the radius of curvature (R) of the corners is 0.4 mm can be used.

Then, by a machining process, both surfaces in a width direction of the wire material 40 and both surfaces in a thickness direction thereof are removed by machining to a machined depth (D) over a predetermined range in a longitudinal direction at predetermined distances along the wire material 40. Thus, a portion of the electrical conductor 39 on both sides of the wire material 40 in both the width and thickness directions is removed together with the insulation coating 41, and a reduced outer portion 42 is obtained as shown in FIGS. 3 and 4. As shown in FIG. 5, the machined depth (D) is the minimum depth at which the insulation coating 41 on the corners is removed, and is determined by the insulation coating thickness ($\delta$) and the radius of curvature (R) of the corners, being given by $D=R-(R-\delta)/2^{1/2}$. In this example, the machined depth (D) is 0.145 mm.

Next, the wire material 40 is cut at the longitudinal center of each of the reduced outer portions 42 to obtain coil members 44 having a predetermined length. As shown in FIG. 6, the width and thickness of both ends of these coil members 44 are narrow and the insulation coating 41 has been removed from both ends to form weld portions 45.

Figure 39:
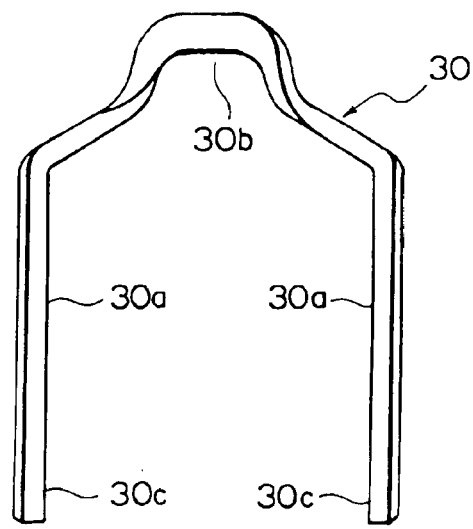
FIG. 39 is a plan showing a coil segment in a conventional stator.
Figure 40:
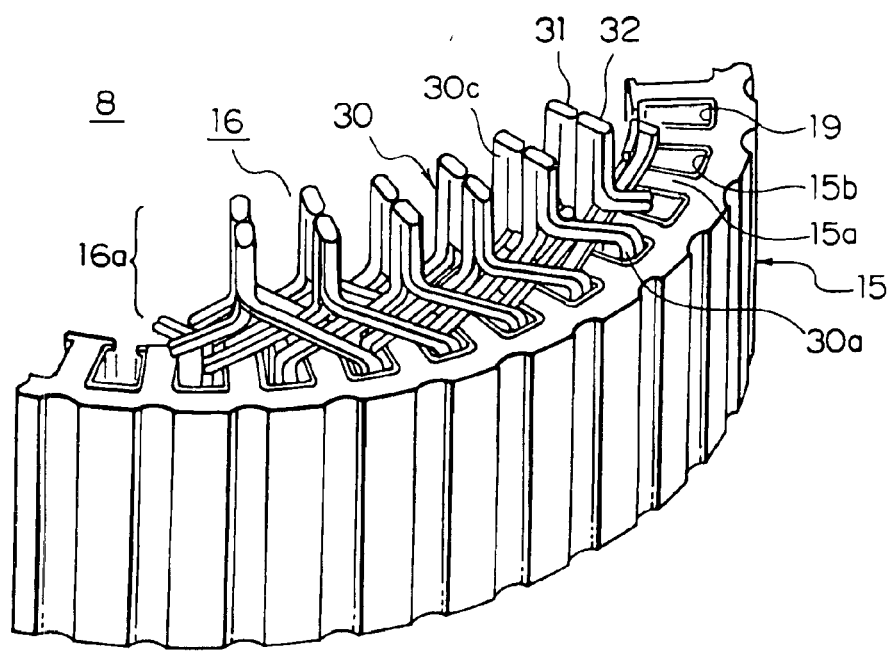
FIG. 40 is a perspective of part of the conventional stator viewed from the front end.
Figure 41:
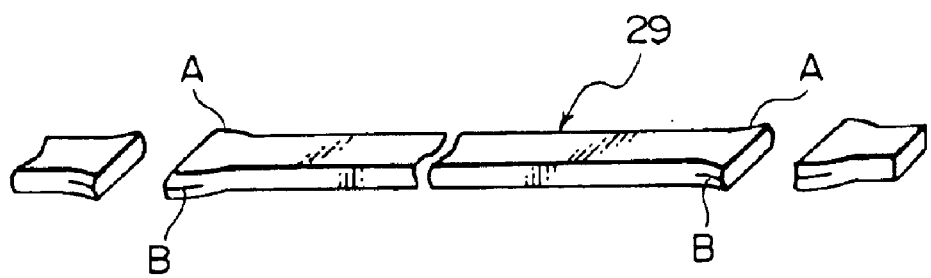
FIG. 41 is a perspective showing coil members formed by cutting wire material in a conventional method for manufacturing a stator for an alternator.
Figure 42:
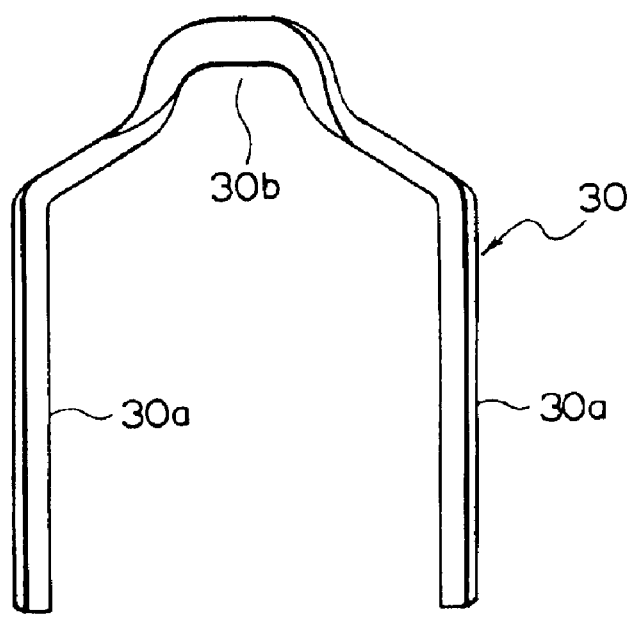
FIG. 42 is a plan showing a coil segment formed by applying a bending process to a coil member in the conventional method for manufacturing a stator for an alternator.
Figure 43:
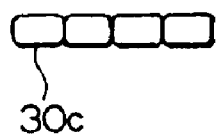
FIG. 43 is an end elevation explaining arrangement of free end portions of coil segments inserted into a stator core in the conventional method for manufacturing a stator for an alternator.
Figure 44:
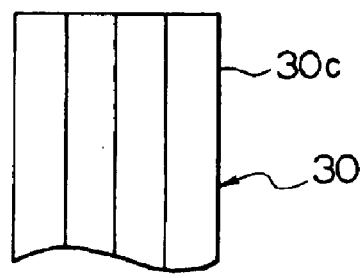
FIG. 44 is a side elevation explaining the arrangement of the free end portions of coil segments inserted into a stator core in the conventional method for manufacturing a stator for an alternator.
Figure 45:
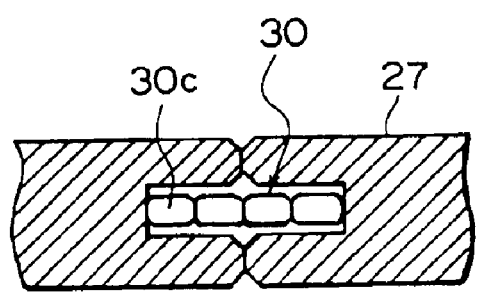
FIG. 45 is an end elevation explaining welding of the free end portions of coil segments in the conventional method for manufacturing a stator for an alternator.
Figure 46:
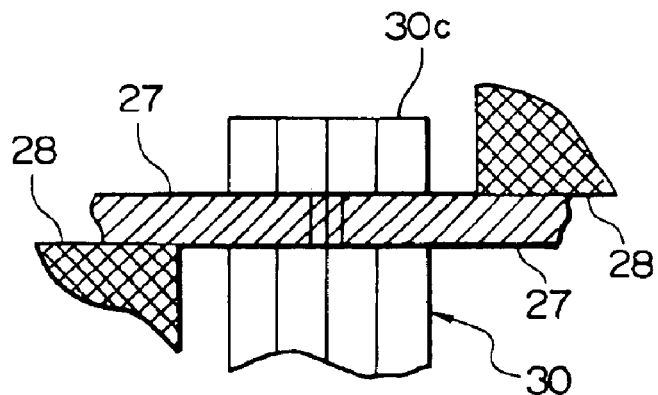
FIG. 46 is a side elevation explaining welding of the free end portions of coil segments in the conventional method for manufacturing a stator for an alternator.
Figure 47:
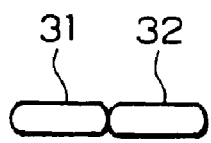
FIG. 47 is an end elevation explaining the welded state of the free end portions of coil segments in the conventional method for manufacturing a stator for an alternator.
Figure 48:
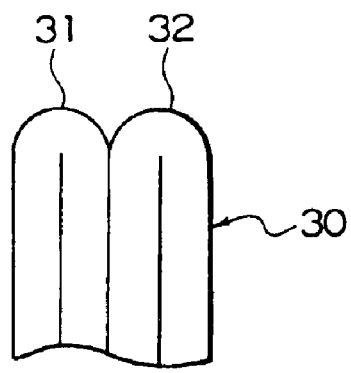
FIG. 48 is a side elevation explaining the welded state of the free end portions of coil segments in the conventional method for manufacturing a stator for an alternator.

Coil segments 50, which function as coil wires, are obtained by further applying a bending process to add twists to the coil members 44. As shown in FIG. 7, the coil segments 50 are formed in a general U shape having a pair of straight portions 50a connected by a generally V-shaped turn portion 50b. The weld portions 45 of the coil members 44 constitute free end portions 50c of the coil segments 50. Moreover, the coil segments 50 are constructed in the same way as the coil segments 30 shown in FIG. 39 except for the fact that the free end portions 50c (the weld portions 45) are formed with a narrow width and thickness.

Then, the coil segments 50 are inserted two at a time into pair of slots 15b separated by three slots such that the heights of the turn portions 50b are uniform. Here, four straight portions 50a are housed in each slot 15b such that the longitudinal direction of the cross sections of the straight portions 50a are aligned in the radial direction so as to line up in a row radially. Then, the free end portion sides of the coil segments 50 projecting from each of the slots 15b are each bent circumferentially in the vicinity of the end of the stator core 15, and the free end portions 50c are each additionally bent such that the longitudinal direction of the cross sections thereof are each aligned and the free end portions 50c are parallel to the axial direction. Thus, the two free end portions 50c of coil segments 50 projecting from the first and third addresses of a first slot 15b and the two free end portions 50c of coil segments 50 projecting from the second and fourth addresses of a second slot 15b three slots away are lined up in the radial direction as shown in FIGS. 8 and 9.

Next, the ends of the four coil segments 50 are held by lining up clamping jigs 27 in a straight line and bringing the tips of the jigs 27 together, as shown in FIGS. 10 and 11. Then, the free end portions 50c of the two coil segments 50 on the inner circumferential side are fused and joined by TIG welding using an arc. The free end portions 50c of the two coil segments 50 on the outer circumferential side are fused and joined in the same way by TIG welding using an arc. Thus, as shown in FIGS. 12 and 13, inner circumferential weld portions 51 and outer circumferential weld portions 52 are obtained. Three winding phase groups having four turns in each phase are obtained by welding each of the free end portions 50c. In addition, the winding phase groups are connected in a Y-connection, for example, to form a stator coil 61. Thus, a stator 60 is obtained having the stator coil 61 wound onto the stator core 15 as shown in FIG. 14.

The stator coil 61 constructed in this manner is wound into the stator core 15 in a wave winding by welding together the free end portions 50c of a large number of coil segments 50 so as to alternately occupy an inner and an outer layer in a slot depth direction within every third slot 15b. Although not shown, the turn portions 50b of the coil segments 50 in the rear-end coil end group of the stator coil 61 constructed in this manner are constructed so as to be aligned in the circumferential direction in two lines radially at the rear end of the stator core 15. On the other hand, the front-end coil end group 61a is constructed such that inner circumferential joint portions 51 formed by radially stacking and welding the free end portions 50c of the coil segments 50 projecting from the first address of first slots 15b and the free end portions 50c of the coil segments 50 projecting from the second addresses of second slots 15b three slots away, and outer circumferential joint portions 52 formed by radially stacking and welding the free end portions 50c of the coil segments 50 projecting from the third addresses of first slots 15b and the free end portions 50c of the coil segments 50 projecting from the fourth addresses of second slots 15b three slots away are arranged circumferentially so as to line up in two rows radially.

The stator 60 prepared in this manner is mounted in an alternator in place of the conventional stator 8 and operates in the same way.

According to Embodiment 1 of the present invention, because reduced outer portions 42 are formed in the wire material 40 and then the wire material 40 is cut at the reduced outer portions 42 to obtain the coil members 44, any bulges and burrs arising on side portions of the cut sections of the reduced outer portions 42 have a smaller profile than the outer dimension of the wire material 40. Thus, when the coil segments 50 are being inserted into the slots 15b, the bulges and burrs are prevented from interfering with the slots 15b or damaging the insulating paper 19. Insertion of the coil into the slots is thereby improved and the occurrence of insulation defects is suppressed, enabling productivity and reliability to be improved.

Because the electrical conductor 39 on both sides of the wire material 40 in the width direction is cut away together with the insulation coating 41 by the machining process to form the width-reduced portions, the surface area over which the insulation coating 41 must be removed is reduced, enabling the time required for removing the insulation coating 41 to be shortened.

Furthermore, because the insulation coating 41 is removed from the upper and lower surfaces of the width-reduced portions (both surfaces in a thickness direction) by applying the machining process, the formation of the width-reduced portions and the removal of the insulation coating 41 can be carried out continuously by the same process, enabling a reduction in the process time.

Because the machined depth (D) is set to satisfy the expression $D=R-(R-\delta)/2^{1/2}$, the insulation coating 41 on the corner portions can be reliably removed and at the same time the occurrence of welding defects due to excessive machining can be suppressed.

Furthermore, in a rear-end coil end group 16a, the free end portions 50c of the coil segments 50 are disposed so as to line up in one row radially within each slot with the longitudinal directions (width directions) of the cross sections thereof aligned, and because the free end portions 50c (weld portions 45) of the U-shaped coil segments 50 are formed to be narrow, a predetermined spacing is formed between the free end portions 50c of the coil segments 50, ensuring adequate welding space.

Thus, when the free end portions 50c of the two coil segments 50 on the inner circumferential side are being welded, for example, the heat from welding is not easily transmitted to the free end portions 50c of the coil segments 50 on the outer circumferential side, thereby suppressing accidental welding to the free end portions 50c on the outer circumferential side and improving productivity.

Because the free end portions 50c being joined are sufficiently fused, weld surface area can be ensured. In addition, because the insulation coating 41 is removed from the free end portions 50c being joined, there is no deterioration in welding as a result of unremoved insulation coating. Thus, ample weld strength is obtained and dislodgment of the joint portions due to vibrations from the engine can be prevented, improving reliability. Furthermore, the electric resistance of the joint portions is reduced, enabling the amount of heat generated by the output current during power generation to be suppressed, thereby preventing drops in output due to temperature increases.

In addition, because the volume of the portions to which heat is applied during welding is reduced, welding time is reduced, enabling weld beads formed on the joint portions to be reduced. As a result, spacing is ensured between the inner circumferential joint portions 51 and the outer circumferential joint portions 52, suppressing the occurrence of layer shorting due to vibrations and thereby improving reliability.

Moreover, in Embodiment 1 above, the four free end portions 50c which align radially are clamped together in clamping jigs 27, the two free end portions 50c on the inner circumferential side are welded together, and the two free end portions 50c on the outer circumferential side are welded together, but the four free end portions 50c which align radially may also be damped into the clamping jigs 27 two at a time and welded. That is to say, the two free end portions 50c on the inner circumferential side are clamped in the clamping jigs 27 and welded, then the two free end portions 50c on the outer circumferential side are damped in the clamping jigs 27 and welded.

Embodiment 2

Figure 15:
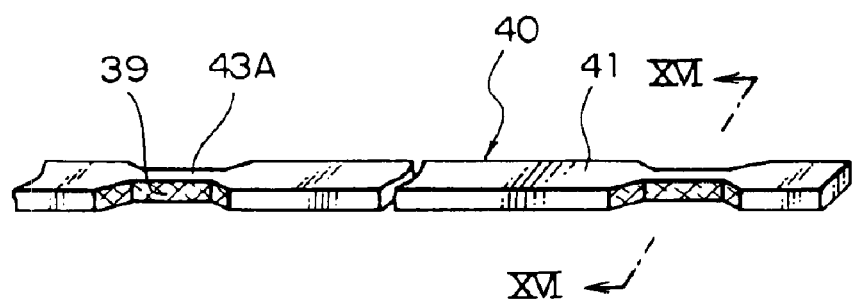
FIG. 15 is a perspective showing width-reduced portions formed in wire material in a method for manufacturing a stator for an alternator according to Embodiment 2 of the present invention.
Figure 16:
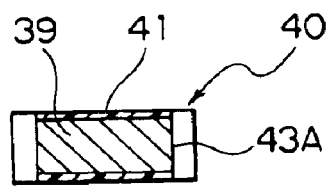
FIG. 16 is a cross section taken along line XVI—XVI in FIG. 15.
Figure 17:
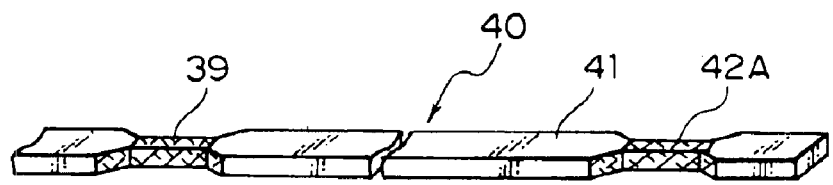
FIG. 17 is a perspective showing width-reduced portions of the wire material with insulation coating removed in the method for manufacturing the stator for an alternator according to Embodiment 2 of the present invention.

FIG. 15 is a perspective showing width-reduced portions formed in a wire material in a method for manufacturing a stator for an alternator according to Embodiment 2 of the present invention, FIG. 16 is a cross section taken along line XVI—XVI in FIG. 15, and FIG. 17 is a perspective showing width-reduced portions of wire material with insulation coating removed in a method for manufacturing a stator for an alternator according to Embodiment 2 of the present invention.

Embodiment 2 is constructed similarly to Embodiment 1 above except for the fact that width-reduced portions 43A are formed in the wire material 40 using a press-cutting method instead of a machining process.

As shown in FIGS. 15 and 16, in Embodiment 2, the width-reduced portions 43A are formed by cutting the electrical conductor 39 on both sides of the wire material 40 together with the insulation coating 41 in the width direction over a predetermined range in the longitudinal direction at predetermined distances using the press-cutting method.

Then, the insulation coating 41 is removed by applying a machining process to the upper and lower surfaces (both surfaces in the thickness direction) of the width-reduced portions 43A of the wire material 40.

Thus, the wire material 40 obtained has reduced outer portions 42A with the insulation coating 41 removed as shown in FIG. 17.

The wire material 40 prepared in this manner is cut at the longitudinal center of each of the reduced outer portions 42A to obtain coil members having weld portions at both ends in which the width and thickness profile is reduced, and the insulation coating 41 has been removed, as in Embodiment 1 above. Then, as in Embodiment 1 above, generally U-shaped coil segments prepared by applying a bending process to the coil members are installed in the stator core to make the stator.

Thus, because Embodiment 2 is constructed similarly to Embodiment 1 except for the fact that the width-reduced portions 43A are formed by a press-cutting method, the same effects can be obtained as in Embodiment 1.

Furthermore, according to Embodiment 2, because a press-cutting method, which is simpler than a machining process, is used to form the width-reduced portions 43A, productivity is improved compared to Embodiment 1

Embodiment 3

In Embodiments 1 and 2 above, the insulation coating 41 was removed by applying a machining process to the upper and lower surfaces of the width-reduced portions formed at predetermined distances along the wire material 40, but in Embodiment 3, the insulation coating 41 is burned by directing a flame onto the width-reduced portions of the wire material 40, and then carbides formed by burning the insulation coating 41 are removed by brushing.

According to Embodiment 3, because the insulation coating 41 is burned by a flame, the insulation coating can be removed simply and reliably without contact. Thus, unremoved insulation coating is eliminated from the weld portions, preventing in advance poor weldability as a result of such remnants.

Embodiment 4

In Embodiment 3 above, the insulation coating 41 is burned by directing a flame onto the width-reduced portions of the wire material 40, and then carbides formed by burning the insulation coating 41 are removed by brushing, but in Embodiment 4, the insulation coating 41 is removed by burning it off with a laser focused on the width-reduced portions of the wire material 40.

According to Embodiment 4, because the insulation coating 41 is removed by irradiating it with a laser, carbides from the insulation coating 41 such as those in Embodiment 3 above are not left on the laser-irradiated portions. Thus, the need for a step to remove the carbides by brushing is eliminated, allowing the process to be abbreviated.

Embodiment 5

In Embodiment 3 above, the insulation coating 41 is burned by directing a flame onto the width-reduced portions of the wire material 40, and then carbides formed by the burning of the insulation coating 41 are removed by brushing, but in Embodiment 5, masking is applied to the wire material 40 so as to expose the reduced-width portions, and the insulation coating 41 is dissolved away by immersing the wire material 40 in a solvent of caustic soda (sodium hydroxide) or caustic potash (potassium hydroxide).

According to Embodiment 5, because the insulation coating 41 can be dissolved away by immersing the reduced-width portions of the wire material 40 in the solvent, the insulation coating 41 of the reduced-width portions can be reliably removed.

Here, after preparing the coil members by cutting the wire material 40 formed with the reduced-width portions into predetermined lengths, a large number of the coil members may be bundled and the insulation coating 41 of the reduced-width portions thereof may be dissolved away by immersing those reduced-width portions in a solvent. In that case, because the insulation coating 41 is removed from a large number of the reduced-width portions of the coil members together, the insulation coating removal process can be shortened.

Embodiment 6

In Embodiment 6, the region where each width-reduced portion is to be formed on the wire material 40 is rolled before cutting and removing the electrical conductor 39 on both sides of the wire material 40 in the width direction by a press-cutting process.

Moreover, Embodiment 6 is the same as Embodiment 2 except for the fact that the rolling process is applied before forming the width-reduced portion.

The characteristics of Embodiment 6 will now be explained with reference to FIGS. 18 to 21.

Figure 18:
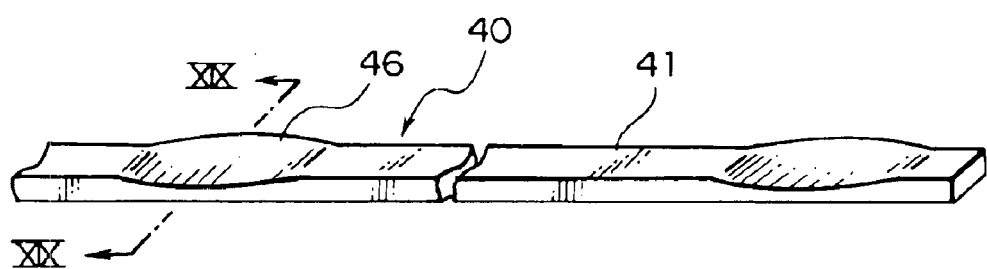
FIG. 18 is a perspective showing thickness-reduced portions formed in wire material in a method for manufacturing a stator for an alternator according to Embodiment 6 of the present invention.
Figure 19:
FIG. 19 is a cross section taken along line XIX—XIX in FIG. 18.

First, as shown in FIGS. 18 and 19, thickness-reduced portions 46 are formed by rolling the wire material 40 over a predetermined range in the longitudinal direction at predetermined distances along the wire material 40.

Figure 20:
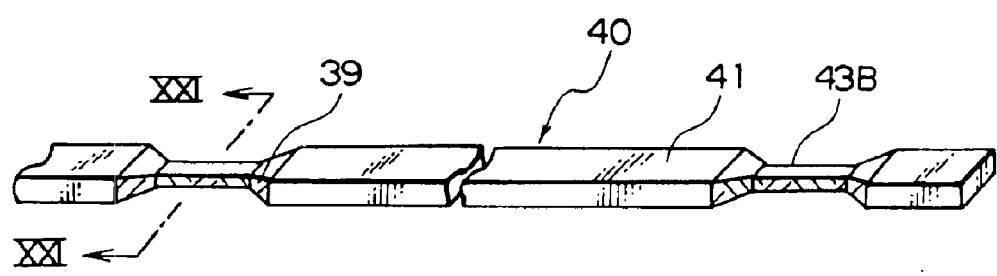
FIG. 20 is a perspective showing width-reduced portions formed in wire material in a method for manufacturing the stator for an alternator according to Embodiment 6 of the present invention.
Figure 21:
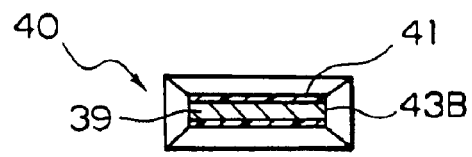
FIG. 21 is a cross section taken along line XXI—XXI in FIG. 20.

Then, as shown in FIGS. 20 and 21, width-reduced portions 43B are formed by cutting and removing the electrical conductor 39 on both sides of the wire material 40 in the width direction together with the insulation coating 41 over a predetermined range in the longitudinal direction at predetermined distances using a press-cutting method.

As in Embodiment 2, reduced outer portions are formed in the wire material 40 prepared in this manner by removing the insulation coating 41 from the reduced-width portions 43B, and the coil members are obtained by cutting the wire material 40 at the longitudinal centers of the reduced outer portions. The coil members are bent to form the generally U-shaped coil segments, and the coil segments are installed in the stator core to make a stator.

According to Embodiment 6, because the rolling process for the wire material 40 is introduced before the process for forming the reduced-width portions 43B, the cross-sectional area of the coil presented to the cutter is bigger in the process of forming the width-reduced portions by the press-cutting method, enabling the wire material 40 to be reliably press cut. Furthermore, because the free end portions of the coil segments become thinner, the insertion of the coil into the slots 15b is improved.

Embodiment 7

Figure 22:
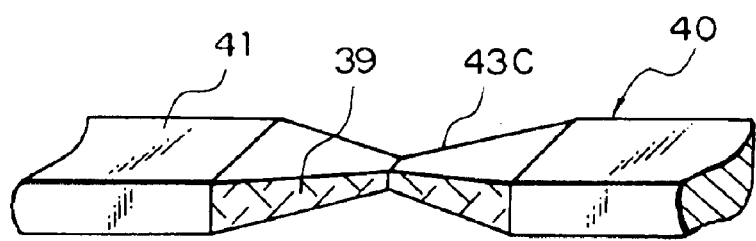
FIG. 22 is a perspective showing width-reduced portions formed in wire material in a method for manufacturing a stator for an alternator according to Embodiment 7 of the present invention.

As shown in FIG. 22, in Embodiment 7, width-reduced portions 43C are formed by cutting and removing thickness-reduced portions of the wire material 40 by a press-cutting process such that longitudinally central portions thereof become slender. Then, reduced outer portions are formed by removing the insulation coating 41 from the width-reduced portions 43C, and coil members are prepared by cutting the wire material 40 at a longitudinally central portion of each of the reduced outer portions.

Embodiment 7 is the same as Embodiment 6 except for the fact that the longitudinally central portions of the thickness-reduced portions are press cut so as to be slender.

According to Embodiment 7, because the width-reduced portions 43C are formed by cutting and removing such that the longitudinally central portions of the thickness-reduced portions of the wire material 40 are made slender, the weld portions at both ends of the coil members which are prepared by cutting the wire material 40 at longitudinally central portions of the reduced outer portions have a tapered shape. Thus, the insertion of the coil segments into the slots 15b is improved, and the arc can be concentrated on the tips of the weld portions during welding, further improving weldability.

Embodiment 8

Figure 23:
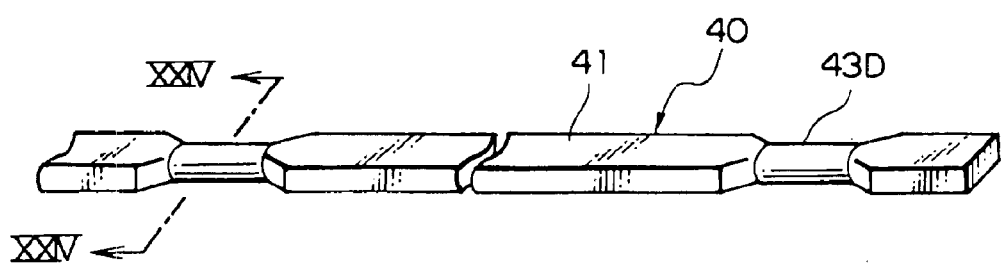
FIG. 23 is a perspective showing width-reduced portions formed in wire material in a method for manufacturing a stator for an alternator according to Embodiment 8 of the present invention.
Figure 24:
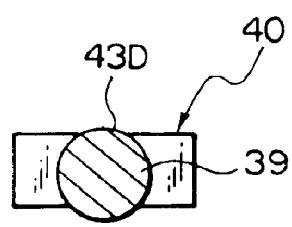
FIG. 24 is a cross section taken along line XXIV—XXIV in FIG. 23.
Figure 25:
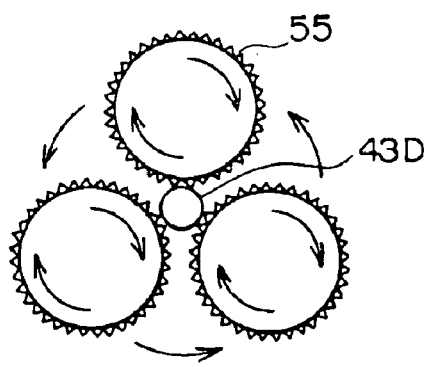
FIG. 25 is a diagram explaining removal of insulation coating from width-reduced portions of wire material in the method for manufacturing the stator for an alternator according to Embodiment 8 of the present invention.

As shown in FIGS. 23 and 24, in Embodiment 8, width-reduced portions 43D having a circular cross section are formed by squeezing the wire material 40 over a predetermined range in the longitudinal direction at predetermined distances along the wire material 40 using a press. Then, as shown in FIG. 25, a reduced outer portion is formed by removing the insulation coating 41 from the width-reduced portions 43D of the wire material 40 by positioning three machine tools 55 so as to surround the width-reduced portions 43D, turning the machine tools 55, and rotating the three machine tools together around the width-reduced portion 43D.

According to Embodiment 8, because the width-reduced portions 43D are formed with a circular cross section, the insulation coating 41 can also be removed completely using machine tools 55, preventing deterioration in welding caused by unremoved insulation coating.

Embodiment 9

In Embodiment 9, after removal of the insulation coating 41 from the width-reduced portions 43D by the machine tools 55 shown in Embodiment 8, a rolling process is added for forming reduced outer portions 42E having a rectangular cross section by rolling the width-reduced portions 43D.

Figure 26:
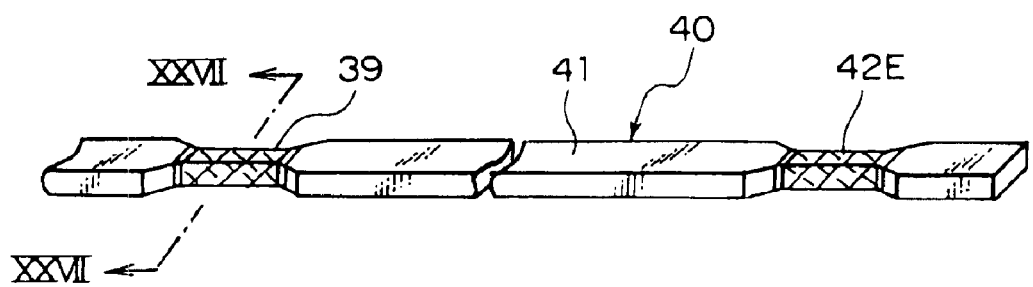
FIG. 26 is a perspective showing width-reduced portions formed in wire material in a method for manufacturing a stator for an alternator according to Embodiment 9 of the present invention.
Figure 27:
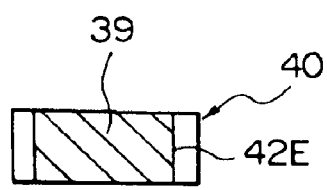
FIG. 27 is a cross section taken along line XXVII—XXVII in FIG. 26.

According to Embodiment 9, because reduced outer portions 42E having a rectangular cross section are obtained as shown in FIGS. 26 and 27, the contact surface area between weld portions being joined to each other is increased, enabling joint strength to be increased. Thus, dislodgment of the joint portions due to vibrations from the vehicle or from the engine can be prevented.

Embodiment 10

Figure 28:
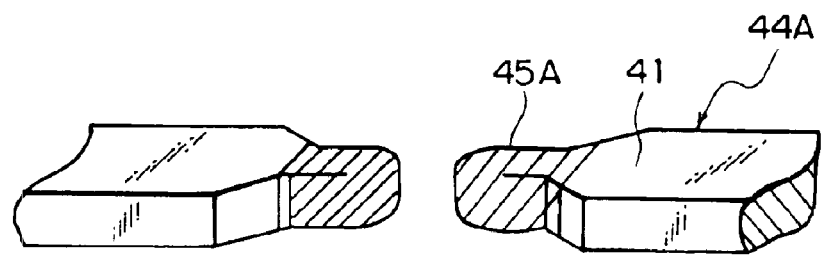
FIG. 28 is a perspective showing parts of coil members in a method for manufacturing a stator for an alternator according to Embodiment 10 of the present invention.

As shown in FIG. 28, in Embodiment 10, after forming coil members 44A by cutting the wire material 40 at longitudinally central portions of the reduced outer portions, weld portions 45A at both ends of the coil members 44A are fused by heating.

Moreover, Embodiment 10 is constructed in the same way as Embodiment 2 above except for the fact that the weld portions 45A at both ends of the coil members 44A are fused by heating.

According to Embodiment 10, because the weld portions 45A at both ends of the coil members 44A are fused by heating, corner portions of the weld portions 45A are fused into a smooth profile. Thus, any bulges and burrs which form on side portions of the cut surfaces of the reduced outer portions when the coil members 44A are formed by cutting the wire material 40 at the longitudinally central portions of the reduced outer portions are eliminated, thereby improving insertion of the coil segments into the slots.

Thus, the same effect can be achieved by heat fusing the free end portions at both ends of the coil segments after the coil segments have been formed from the coil members.

Embodiment 11

Embodiments 1 to 10 above apply to a stator coil prepared using coil segments 50 obtained by bending short coil members into a general U shape, but Embodiment 11 applies to a stator coil prepared using long coil wires obtained by bending long coil members into a wave shape.

Figure 29:
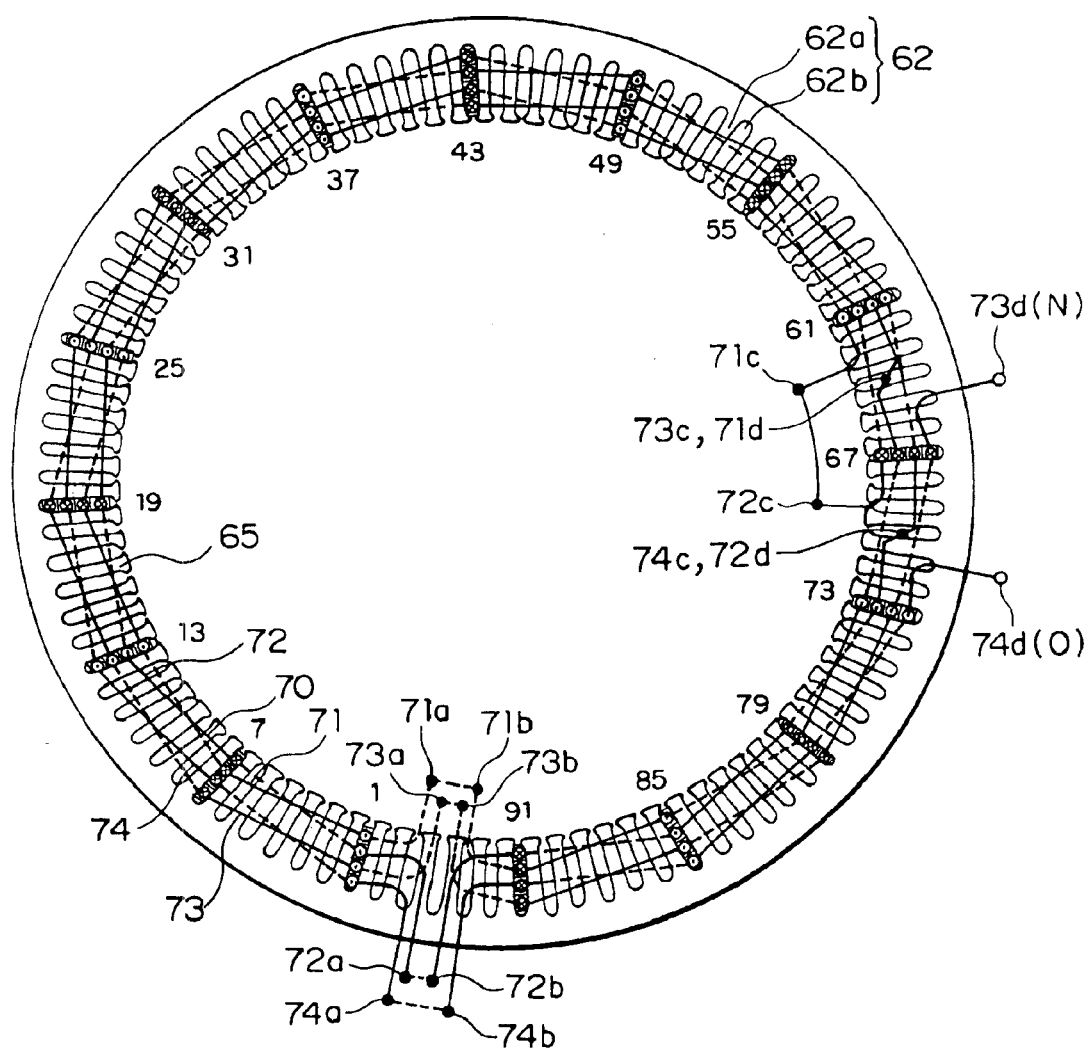
FIG. 29 is an end elevation explaining connections in one stator coil phase group in the stator for an alternator according to Embodiment 11 of the present invention.

First, the winding construction of one stator winding phase group will be explained in detail with reference to FIG. 29. Moreover, in FIG. 29, the wiring at a first axial end of the stator core is represented by solid lines and the wiring at a second axial end of the stator core is represented by dotted lines. Furthermore, a stator core 62 is formed into a cylindrical shape, a number of teeth 62a having a generally rectilinear cross section being disposed at even pitch in a circumferential direction so as to protrude radially inwards and slots 62b for housing the coil being formed between the teeth 62a. The grooves of each of the slots 62b are parallel to an axial direction, and open to an inner circumferential side. In this stator core 62, ninety-six slots 62b are formed so as to house two three-phase stator windings 64 which will be described below such that the number of slots housing each winding phase group corresponds to the number of magnetic poles (sixteen) in the rotor, the number of slots being two per phase per pole.

One stator winding phase group 65 is constituted by first to fourth winding sub-portions 71 to 74 functioning as coil wires in each of which one coil member 70 is formed into a wave shape. The first winding sub-portion 71 is constructed by wave winding one coil member 70 into every sixth slot from slot numbers 1 to 91 so as to alternately occupy a first position from an inner circumferential side (first address) and a second position from the inner circumferential side (second address) inside the slots 62b. The second winding sub-portion 72 is constructed by wave winding a coil member 70 into every sixth slot from slot numbers 1 to 91 so as to alternately occupy the second address and the first address inside the slots 62b. The third winding sub-portion 73 is constructed by wave winding a coil member 70 into every sixth slot from slot numbers 1 to 91 so as to alternately occupy a third position from the inner circumferential side (third address) and a fourth position from the inner circumferential side (fourth address) inside the slots 62b. The fourth winding sub-portion 74 is constructed by wave winding a coil member 70 into every sixth slot from slot numbers 1 to 91 so as to alternately occupy the fourth address and the third address inside the slots 62b.

Then, at the first end of the stator core 62, a first end portion 72a of the second winding sub-portion 72 extending outwards from the second address of slot number 1 is joined to a second end portion 72b of the second winding sub-portion 72 extending outwards from the first address of slot number 91 to form a winding sub-portion having one turn, and in addition, a first end portion 74a of the fourth winding group 74 extending outwards from the fourth address of slot number 1 is joined to a second end portion 74b of the fourth winding group 74 extending outwards from the third address of slot number 91 to form a winding sub-portion having one turn.

Furthermore, at the second end of the stator core 62, a first end portion 71a of the first winding sub-portion 71 extending outwards from the first address of slot number 1 is joined to a second end portion 71b of the first winding sub-portion 71 extending outwards from the second address of slot number 91 to form a winding sub-portion having one turn, and in addition, a first end portion 73a of the third winding group 73 extending outwards from the third address of slot number 1 is joined to a second end portion 73b of the third winding group 73 extending outwards from the fourth address of slot number 91 to form a winding sub-portion having one turn.

Thus, each of the first to fourth winding sub-portions 71 to 74 constitutes a winding sub-portion having one turn in which one coil member 70 is wound into every sixth slot 62b so as to alternately occupy an inner and an outer layer in a slot depth direction. Within each of the slots 62b, the coil members 70 are arranged to line up in a row of four radially by radially aligning the longitudinal direction of the flat cross sections (rectilinear cross sections) of the coil members 70.

Next, a portion of the coil member 70 of the first winding subportion 71 extending outwards from the first address of slot number 61 and the second address of slot number 67 at the first axial end of the stator core 62 is cut, and a portion of the coil member 70 of the third winding subportion 73 extending outwards from the third address of slot number 61 and the fourth address of slot number 67 at the first axial end of the stator core 62 is also cut. In addition, a portion of the coil member 70 of the second winding sub-portion 72 extending outwards from the first address of slot number 67 and the second address of slot number 73 at the first axial end of the stator core 62 is cut, and a portion of the coil member 70 of the fourth winding sub-portion 74 extending outwards from the third address of slot number 67 and the fourth address of slot number 73 at the first axial end of the stator core 62 is also cut.

Then, the first cut end 71c of the first winding sub-portion 71 is joined to the first cut end 72c of the second winding sub-portion 72, the first cut end 73c of the third winding sub-portion 73 is joined to the second cut end 71d of the first winding sub-portion 71, the first cut end 74c of the fourth winding sub-portion 74 is joined to the second cut end 72d of the second winding sub-portion 72, to form one stator winding phase group 65 having four turns constructed by connecting the first to fourth winding subportions 71 to 74 in series.

Moreover, the joint portion between the first cut end 71c of the first winding sub-portion 71 and the first cut end 72c of the second winding sub-portion 72, the joint portion between the first cut end 73c of the third winding sub-portion 73 and the second cut end 71d of the first winding sub-portion 71, and the joint portion between the first cut end 74c of the fourth winding sub-portion 74 and the second cut end 72d of the second winding sub-portion 72 become crossover connection portions, the second cut end 73d of the third winding sub-portion 73 and the second cut end 74d of the fourth winding sub-portion 74 become a neutral point (N) and an output wire (O), respectively.

Figure 30:
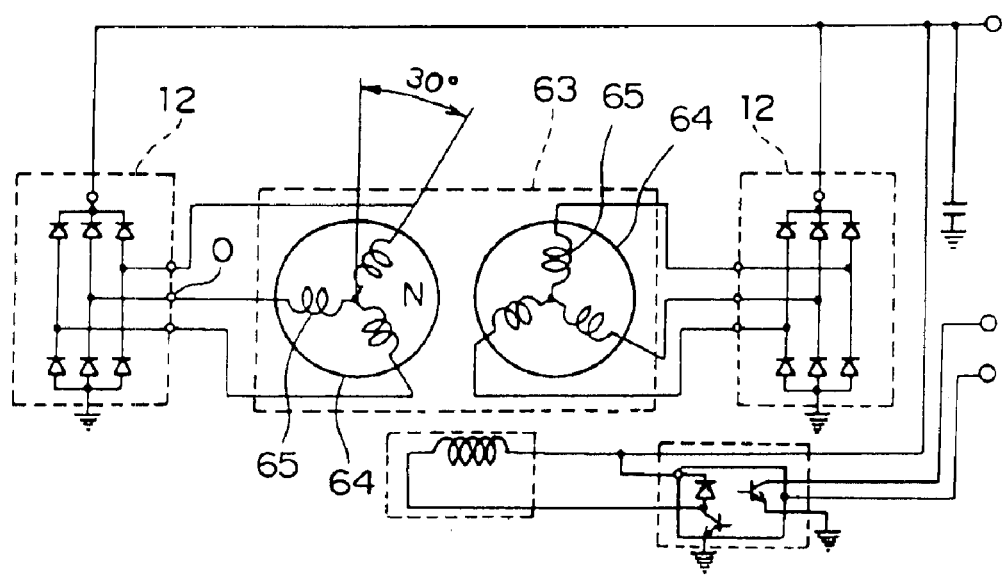
FIG. 30 is a circuit diagram for the stator for an alternator according to Embodiment 11 of the present invention.

A total of six stator winding phase groups 65 are similarly formed by offsetting the slots 62b into which the first to fourth winding sub-portions 71 to 74 are wound one slot at a time. Then, as shown in FIG. 30, three stator winding phase groups 65 are connected into each of two Y connections to form a stator coil 63 which is composed of two three-phase stator windings 64, each of the three-phase stator windings 64 being connected to its own rectifier 12. Each rectifier 12 is connected in parallel so that the direct-current output from each is combined.

Thus, each of the coil members 70 constituting the first to fourth winding sub-portions 71 to 74 is wound into a wave winding so as to extend outwards from first slots 62b at axial ends of the stator core 62, fold back, and enter second slots 62b six slots away. Each coil member 70 is wound so as to alternately occupy an inner layer and an outer layer in a slot depth direction (radially) in every sixth slot. The first winding sub-portion 71 and the second winding sub-portion 72 are offset by an electrical angle of 180° so as to be inversely wound relative to each other. Similarly, the third winding sub-portion 73 and the fourth winding sub-portion 74 are also are offset by an electrical angle of 180° so as to be inversely wound relative to each other.

Turn portions 81a of the coil members 70 extend outwards from axial end surfaces of the stator core 62 and fold back to form coil ends. Thus, at both axial ends of the stator core 62, the turn portions, which are formed with a substantially identical shape, are separated from each other both circumferentially and radially and are arranged neatly into two rows circumferentially to form front-end and rear-end coil end groups.

Next, the assembly of a stator 60A will be explained in detail with reference to FIGS. 1 to 4 and FIGS. 31 to 37.

First, as shown in FIGS. 1 and 2, a wire material 40 is prepared by coating a flat electrical conductor 39 made of copper or the like having a rectangular cross section with an insulation coating 41. Then, both surfaces in a width direction and both surfaces in a thickness direction of the wire material 40 are machined down to the machined depth (D) over a predetermined range in a longitudinal direction at predetermined distances along the wire material 40. Thus, a portion of each side of the electrical conductor 39 of wire material 40 in the width direction and in the thickness direction is removed together with the insulation coating 41 to obtain reduced outer portions 42 as shown in FIGS. 3 and 4. Next, the long coil members 70 are prepared by cutting the wire material 40 at longitudinally central portions of the reduced outer portions 42. At this time, as shown in FIG. 31, the width and thickness of both ends of the coil members 70 are reduced.

Figure 31:
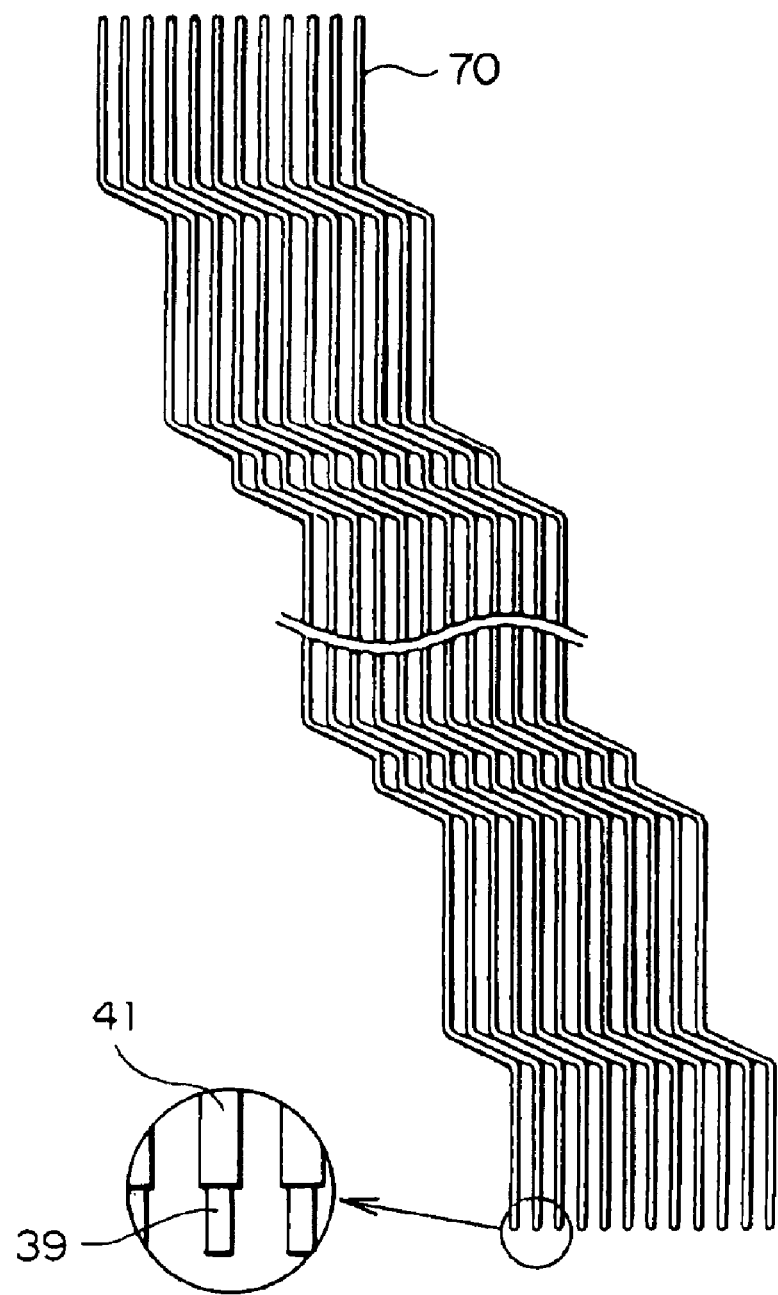
FIG. 31 is a diagram explaining the manufacturing process for coil-wire groups constituting part of a stator coil in the stator for an alternator according to Embodiment 11 of the present invention.
Figure 32:
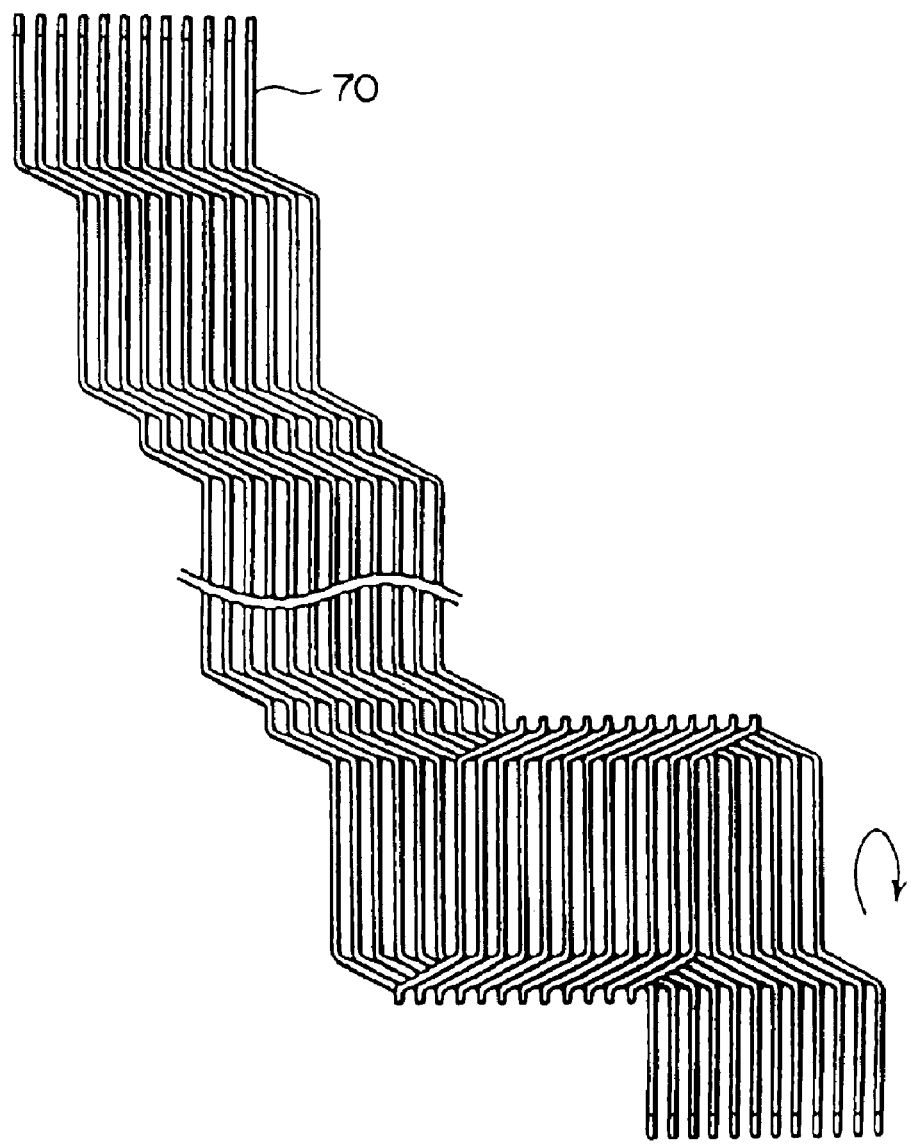
FIG. 32 is a diagram explaining the manufacturing process for coil-wire groups constituting part of the stator coil in the stator for an alternator according to Embodiment 11 of the present invention.
Figures 33A, 33B:
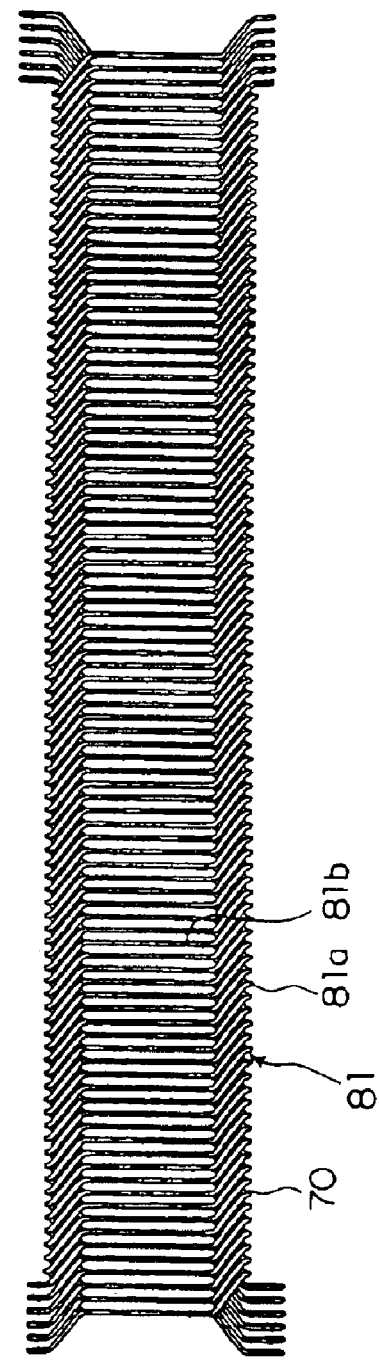
FIG. 33A is an end elevation showing a winding assembly constituting part of the stator coil in the stator for an alternator according to Embodiment 11 of the present invention.
FIG. 33B is a front elevation showing the winding assembly constituting part of the stator coil in the stator for an alternator according to Embodiment 11 of the present invention.

As shown in FIG. 31, twelve coil members 70 prepared in this manner are simultaneously bent in the same plane to form a lightning-bolt shape. Then, a winding assembly 80, shown in FIGS. 33A and 33B, is prepared by progressively folding the coil members 70 at right angles, as indicated by the arrow in FIG. 32, using a jig.

Figure 34:
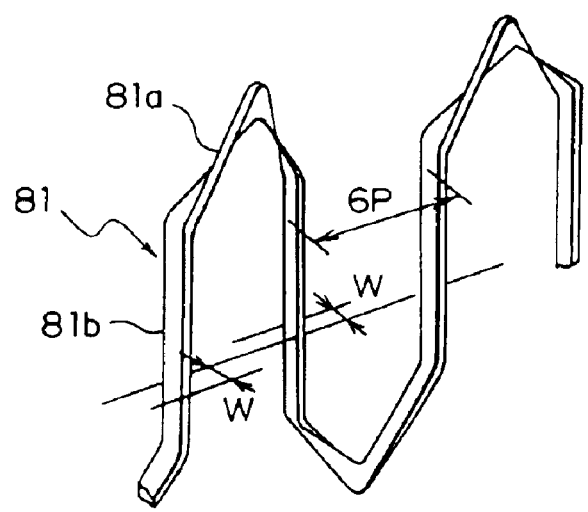
FIG. 34 is a perspective showing part of a strand of coil wire constituting part of the stator coil in the stator for an alternator according to Embodiment 11 of the present invention.
Figure 35:
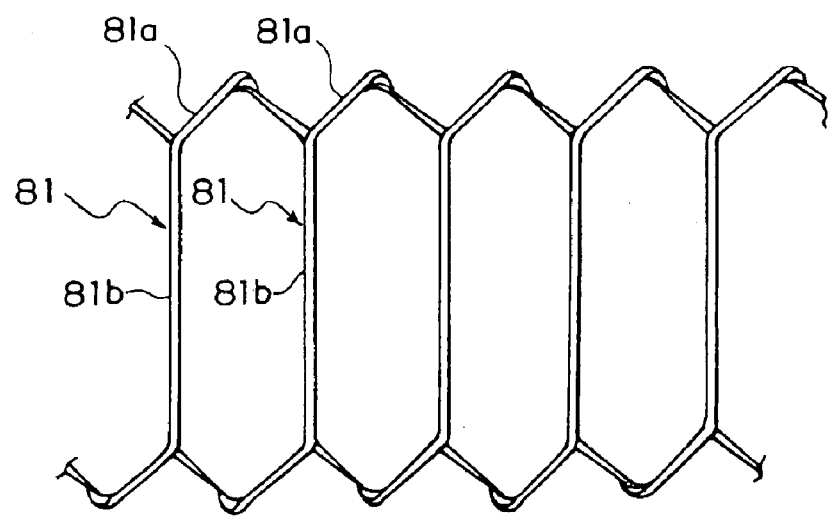
FIG. 35 is a diagram explaining the arrangement of strands of coil wire constituting part of the stator coil in the stator for an alternator according to Embodiment 11 of the present invention.

Moreover, each of the coil members 70 is bent to form a coil wire 81 in a wave-shaped pattern in which straight portions 81b connected by the turn portions 81a are arranged at a pitch of six slots (6P), as shown in FIG. 34. Adjacent straight portions 81b are offset by a distance equal to one width (W) of the coil members 70 by means of the turn portions 81a. The winding assembly 80 is constructed by arranging six coil-wire pairs so as to be offset by a pitch of one slot from each other, each coil-wire pair consisting of two coil wires 81 formed in the above wave-shaped pattern which are offset by a pitch of six slots and arranged such that the straight portions 81b overlap as shown in FIG. 35. Six end portions of the coil wires 81 each extend outwards from first and second sides at first and second ends of the winding assembly 80. Furthermore, the turn portions 81a constituting the coil ends are arranged so as to line up neatly in rows on first and second side portions of the winding assembly 80. Here, each of the coil wires 81 corresponds to one of the first to fourth winding subportions 71 to 74 shown in FIG. 38.

Figure 36:
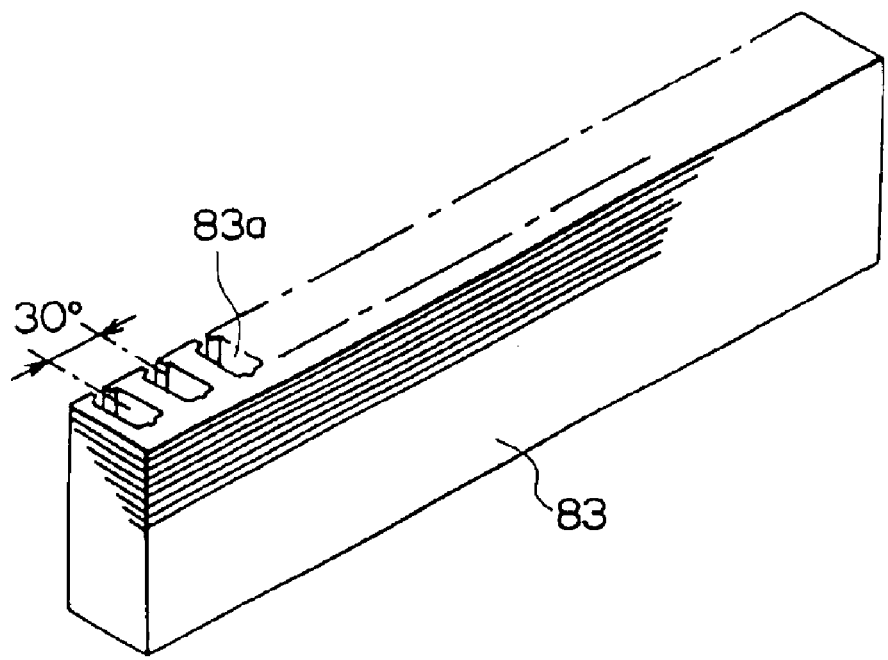
FIG. 36 is a diagram explaining the construction of a laminated core constituting the stator core in the stator for an alternator according to Embodiment 11 of the present invention.
Figure 37A:
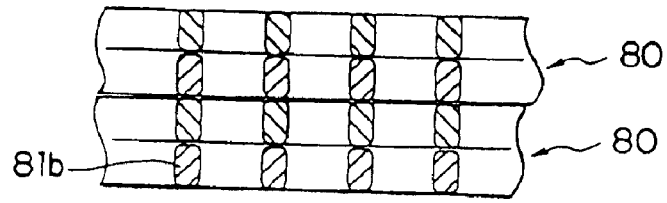
FIG. 37A is a cross section explaining the manufacturing process for the stator in the stator for an alternator according to Embodiment 11 of the present invention.
Figure 37B:
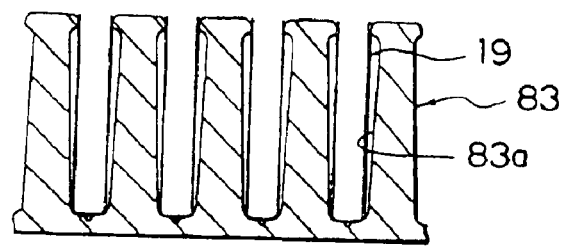
FIG. 37B is a cross section explaining the manufacturing process for the stator in the stator for an alternator according to Embodiment 11 of the present invention.

A parallelepiped laminated core 83 is prepared as shown in FIG. 36 by laminating a predetermined number of sheets of SPCC material, which is a magnetic material, formed with trapezoidal slots 83a at a predetermined pitch (an electrical angle of 30°) and laser welding an outer portion thereof Then, as shown in FIG. 37A, insulators 19 are mounted in the slots 83a of the parallelepiped laminated core 83, and the straight portions 81b of two winding assemblies 80 are inserted so as to stack up within each of the slots 83a. Thus, the two winding assemblies 80 are installed in the parallelepiped laminated core 83 as shown in FIG. 37B. The straight portions 81b of the coil wires 81 are housed in lines of four in a radial direction within the slots 83a and are electrically insulated from the parallelepiped laminated core 83 by the insulators 19. The two winding assemblies 80 are mounted in the parallelepiped laminated core 83 so as to be stacked one on top of the other.

Figure 37C:
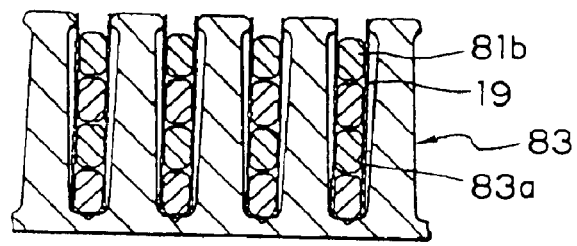
FIG. 37C is a cross section explaining the manufacturing process for the stator in the stator for an alternator according to Embodiment 11 of the present invention.
Figure 37C:
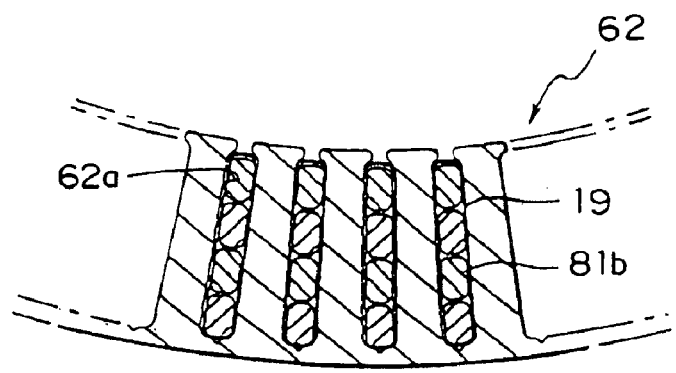

Next, the parallelepiped laminated core 83 is rolled up and its end surfaces are abutted and welded to each other to obtain the cylindrical stator core 62, as shown in FIG. 37C.

Figure 38:
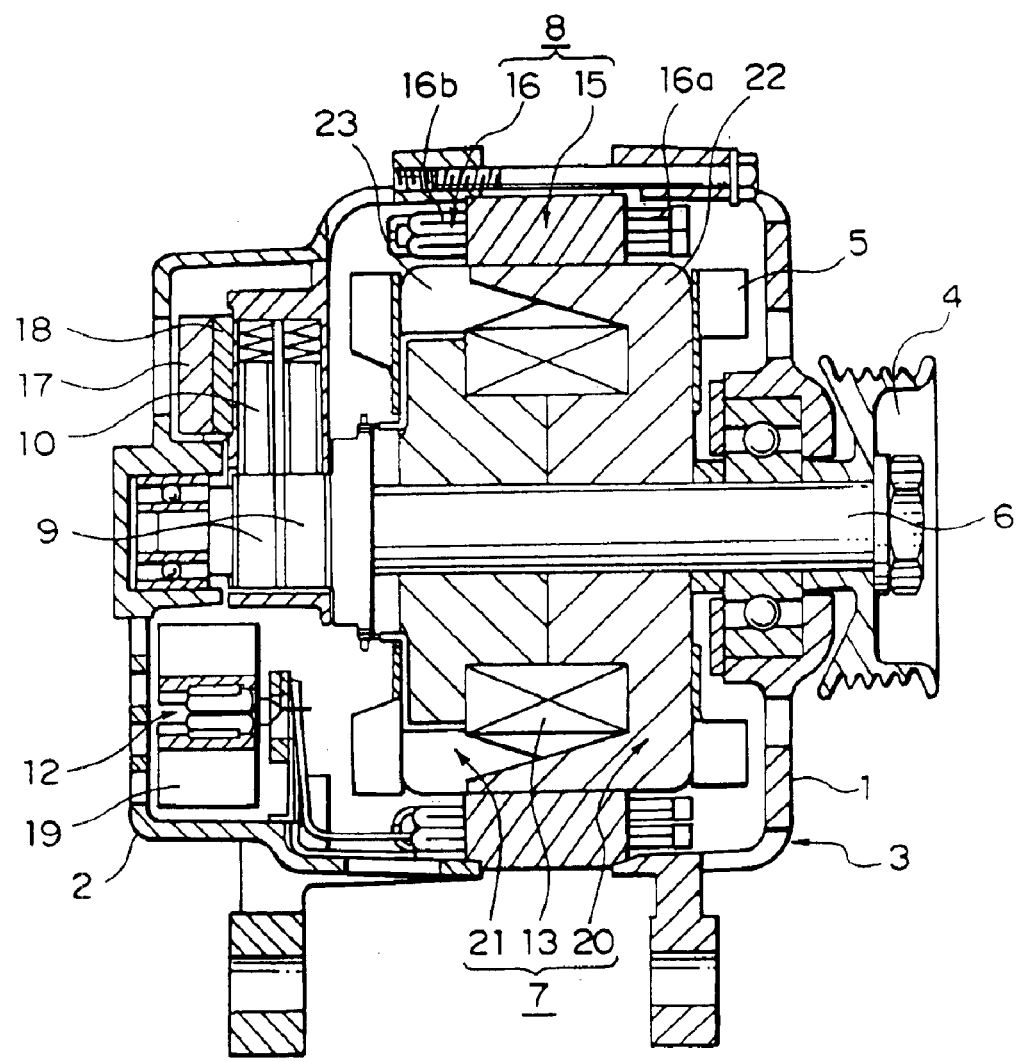
FIG. 38 is a cross section showing a generic alternator.

Then, based on the connection method shown in FIG. 38, the stator winding phase groups 65 are formed by connecting the end portions of each of the coil wires 81.

Here, burning off the insulation coating 41 by means of irradiation with a laser is suitable for the removal of the insulation coating 41 from the cut ends of the coil wires 81 used for the crossover connections, the output wires, and the neutral points.

Thus, according to Embodiment 11, because the reduced outer portions 42 are formed in the wire material 40 and then the coil members 70 are obtained by cutting the wire material 40 at the reduced outer portions 42, the insulation coating 41 is removed from the end portions of the coil wires 81 which are formed by bending the coil members 70 into a wave shape, reducing the width and the thickness thereof.

Furthermore, the first to fourth winding sub-portions 71 to 74 constituting one stator winding phase group 65 are each formed into a winding having one turn by welding together the end portions thereof. At that time, the end portions 71a, 71b, 73a, and 73b of the first and third winding sub-portions 71 and 73 are arranged at the second end of the stator core 62 so as to line up in one row radially with the longitudinal direction of the cross sections (width directions) thereof aligned radially, and the end portions 72a, 72b, 74a, and 74b of the second and fourth winding subportions 72 and 74 are arranged at the first end of the stator core 62 so as to line up in one row radially with the longitudinal direction of the cross sections (width directions) thereof aligned radially. Because the width of the coil wires 81, that is to say, the width of each of the end portions of the first to the fourth winding sub-portions, is reduced, predetermined spacing is formed between the end portions 71a and 71b and the end portions 73a and 73b, and similarly between the end portions 72a and 72b and the end portions 74a and 74b, ensuring welding space.

Consequently, the same effects can also be obtained in Embodiment 11 as in Embodiment 1 above.

Furthermore, in Embodiment 11, because each of the winding subportions having one turn is formed from one coil wire 81, the number of joints can be significantly reduced compared to Embodiments 1 to 10 above in which each of the winding sub-portions having one turn is formed from a large number of the U-shaped segments 50 connected in series, enabling the productivity of the stator to be improved, eliminating softening of the electrical conductor due to welding, increasing the rigidity of the stator, and enabling magnetic noise to be reduced.

Furthermore, because the coil end groups are constituted by the turn portions 81a of the coil wires 81, coil end height can be reduced compared to Embodiments 1 to 10 above in which the coil end groups are constituted by welding together the free end portions 50c of the coil segments 50. Thus, wind resistance in the coil end groups is reduced, enabling the reduction of wind noise due to the rotation of the rotor 7, and coil leakage reactance is also reduced, improving output and efficiency.

In addition, because the winding assembly 80 is formed from twelve coil wires 81, six stator winding phase groups 65 are wound by installing two winding assemblies 80 into the stator core 62 in two rows, enabling assembly to be significantly improved.

Moreover, in each of the above embodiments, the width-reduced portions are formed by removing the electrical conductor 39 on both sides of the wire material 40 in the width direction together with the insulation coating 41 by means of a machining process or a press-cutting method, then the reduced outer portions are formed by removing the insulation coating 41 from the width-reduced portions, but the reduced outer portions may also be formed by removing the insulation coating 41 from the wire material 40 over a predetermined longitudinal range generally centered on each of the cutting positions. In that case, the outer dimension of the reduced outer portions is reduced in proportion to the thickness of the insulation coating 41, reducing problems caused by bulges and burrs arising on the side portions of the cut surfaces of the reduced outer portions. Then, when the coil segments or the coil wires formed from the wire material are mounted into the stator core, end portions of the coil segments or the coil wires are separated from each other, ensuring welding space. Moreover, the methods mentioned in Embodiments 3 to 5, for example, burning away the insulation coating with a flame, burn away the insulation coating by irradiating it with a laser, or dissolving away the insulation coating with a solvent, etc., can be used when removing the insulation coating 41.

Furthermore, in each of the above embodiments, four straight portions 50a and 81a of the coil segments 50 or the coil wires 81 are arranged in one row in a radial direction in the each of the slots 15b and 62b, but the number of straight portions arranged in the slots is not limited to this number.

The present invention is constructed in the above manner and exhibits the effects described below.

According to one aspect of the present invention, there is provided a method for manufacturing a stator for an alternator, the method including:

forming coil members by cutting wire material into predetermined lengths, the wire material being composed of an electrical conductor having a flat cross section coated with an insulation coating;

forming coil wires of a predetermined shape by subjecting the coil members to a bending process;

installing a predetermined number of the coil wires into a stator core; and forming a winding group having a predetermined number of turns by welding together end portions of each of the coil wires installed in the stator core, the method further including:

forming a reduced outer portion over a predetermined longitudinal range generally centered on each of the cutting positions on the wire material, enabling producibility and reliability to be improved.

The reduced outer portion may be formed by removing the insulation coating from the wire material over the predetermined longitudinal range centered on each of the cutting positions, eliminating deterioration in weldability as a result of unremoved insulation coating and suppressing the occurrence of weld dislodgement due to vibration.

Forming the reduced outer portion may include:

forming a width-reduced portion by removing first and second edges of the electrical conductor in a width direction together with the insulation coating over a predetermined longitudinal range centered on each of the cutting positions; and removing the insulation coating from first and second edges of the width-reduced portion in a thickness direction, ensuring welding space when welding together the end portions of the coil wires, and reducing the surface area of the width-reduced portions from which the insulation coating is removed, thereby shortening the time required for the process of removing the insulation coating.

The width-reduced portion may be formed by cutting away the first and second edges of the electrical conductor in the width direction together with the insulation coating by a machining process, reducing the surface area of the width-reduced portions from which the insulation coating is removed, and thereby shortening the time required for the process of removing the insulation coating.

The width-reduced portion may be formed by cutting off the first and second edges of the electrical conductor in the width direction together with the insulation coating using a press-cutting method, enabling the width-reduced portion to be prepared easily.

The width-reduced portion may be formed by:

forming a thickness-reduced portion over a predetermined longitudinal range centered on each of the cutting positions by rolling the wire material; and then cutting off the first and second edges of the electrical conductor in the width direction together with the insulation coating at the thickness-reduced portion using a press-cutting method, improving insertion of the coil wires into the slots.

The width-reduced portion may be formed into a shape having a cross section tapering towards a central portion from first and second longitudinal ends, enabling concentration of an arc on the weld portions at the time of welding, thereby increasing weldability and improving weld strength.

The width-reduced portion may be formed by forming the wire material into a round shape of circular cross section over a predetermined longitudinal range centered on each of the cutting positions; and then the insulation coating of the width-reduced portion may be removed by mechanical stripping, enabling the insulation coating to be reliably removed even if a mechanical tool is used, thereby preventing deterioration in weldability as a result of unremoved insulation coating.

The width-reduced portion from which the insulation coating has been mechanically stripped may be formed into a flat shape, improving insertion of the coil wires into the slots.

The insulation coating on the reduced outer portion may be removed by a machining process, enabling the insulation coating to be reliably removed, thereby preventing deterioration in weldability as a result of unremoved insulation coating.

The insulation coating on the reduced outer portions may be burned away by a flame and then carbides formed thereby may be removed by brushing, shortening the time required for the process of removing the insulation coating.

The insulation coating on the reduced outer portion may be removed by burning away by means of irradiation with a laser, making the brushing process unnecessary, thereby shortening the time required for the process of removing the insulation coating.

The insulation coating on the reduced outer portion may be removed by rinsing with a solvent, enabling the insulation coating to be reliably removed, thereby preventing deterioration in weldability as a result of unremoved insulation coating.

A smooth tip shape may be formed by melting corner portions of first and second ends of the coil members or corner portions of the coil wires, improving insertion of the coil wires into the slots.

The coil wires may be formed in a general U shape composed of a pair of straight portions separated by a predetermined number of slots being connected by a turn portion having a general V shape, enabling the stator coil to be prepared by preparing the cylindrical stator core and then inserting the coil wires into the stator core, facilitating the manufacturing of the stator.

The coil wires may be formed into a wave-shaped continuous wire in which straight portions are arranged at a predetermined slot pitch and end portions of adjacent straight portions may be connected to each other by generally V-shaped turn portions, whereby the number of joints is significantly reduced, facilitating the process of installing the coil wires in the stator core and thereby improving productivity, and making the coil ends into continuous-wire turn portions, thereby lowering the axial height of the coil end groups.

According to the present invention, there is provided a stator for an alternator, the stator including:

a cylindrical stator core in which a number of slots having grooves aligned axially are disposed parallel to each other circumferentially so as to be open on an inner circumferential side; and a stator coil constructed by welding together a number of end portions of coil wires having a flat cross section coated with an insulation coating, the stator coil being wound so as to fold back outside the slots at axial end surfaces of the stator core so as to alternately occupy an inner and an outer layer in a slot depth direction within the slots at intervals of a predetermined number of slots, wherein an outer dimension of each of the end portions of the coil wires is reduced compared to other portions of the coil winding, providing superior reliability by ensuring welding space when welding together the end portions of the coil wires, increasing the weld strength in the joint portions between the end portions of the coil wires, and suppressing dislodgement of the joint portions due to vibration, and at the same time, reducing the electrical resistance of the joint portions, lowering the amount of heat generated by the output current during power generation and suppressing reductions in output as a result of temperature increases.

The end portions of the coil wires may be formed such that a width dimension of the end portion of the coil wires is narrower than other portions of the coil wires, and the insulation coating may be removed from the end portions, reliably ensuring welding space when welding together the end portions of the coil wires, and suppressing deterioration in weldability as a result of unremoved insulation coating.

The insulation coating may be removed from the end portions of the coil wires, suppressing deterioration in weldability as a result of unremoved insulation coating.

What is claimed is:

1. A method for manufacturing a stator for an alternator, comprising:

providing a conductor comprising a flat electrically conductive material and an insulation coating, the insulation coating covering an outer surface of the electrically conductive material;

forming one or more reduced outer portions of the conductor by removing, from respective predetermined longitudinal sections of the conductor, the insulation coating and a corresponding portion of the electrically conductive material;

forming coil members by cutting the conductor at cutting positions located within the predetermined longitudinal sections;

forming coil wires of a predetermined shape by subjecting said coil members to a bending process;

installing a predetermined number of said coil wires in a stator core; and forming a winding group having a predetermined number of turns by welding together end portions of each of said coil wires installed in said stator core.

2. The method for manufacturing a stator for an alternator according to claim 1, wherein said forming the one or more reduced outer portions comprises:

forming a width-reduced portion by removing first and second edges of said electrically conductive material in a width direction together with said insulation coating over said predetermined longitudinal sections; and removing said insulation coating from first and second edges of said width-reduced portion in a thickness direction.

3. The method for manufacturing a stator for an alternator according to claim 2 wherein said width-reduced portion is formed by cutting away said first and second edges of said electrically conductive material in said width direction together with said insulation coating by a machining process.

4. The method for manufacturing a stator for an alternator according to claim 2 wherein said width-reduced portion is formed by cutting off said first and second edges of said electrically conductive material in said width direction together with said insulation coating using a press-cutting method.

5. The method for manufacturing a stator for an alternator according to claim 2 wherein said width-reduced portion is formed by:

forming a thickness-reduced portion over a predetermined longitudinal range generally centered on each of said cutting positions by rolling said wire material; and then cutting off said first and second edges of said electrical conductor in said width direction together with said insulation coating at said thickness-reduced portion using a press-cutting method.

6. The method for manufacturing a stator for an alternator according to claim 2 wherein said width-reduced portion is formed into a shape having a cross section tapering towards a central portion from first and second longitudinal ends.

7. The method for manufacturing a stator for an alternator according to claim 2 wherein said insulation coating on said reduced outer portion is removed by a machining process.

8. The method for manufacturing a stator for an alternator according to claim 2 wherein said insulation coating on said reduced outer portion is burned away by a flame and then carbides formed thereby are removed by brushing.

9. The method for manufacturing a stator for an alternator according to claim 2 wherein said insulation coating on said reduced outer portion is removed by burning away by means of irradiation with a laser.

10. The method for manufacturing a stator for an alternator according to claim 2 wherein said insulation coating on said reduced outer portion is removed by dissolution with a solvent.

11. The method for manufacturing a stator for an alternator according to claim 2 further comprising forming a smooth tip shape by melting corner portions of first and second ends of said coil members or said coil wires.

12. The method for manufacturing a stator for an alternator according to claim 1 wherein said forming one or more reduced outer portions comprises:

forming a width-reduced portion by forming said conductor into a round shape of circular cross section over said predetermined longitudinal sections centered on each of said cutting positions; and removing said insulation coating of said width-reduced portion by mechanical stripping.

13. The method for manufacturing a stator for an alternator according to claim 12 further comprising forming said width-reduced portion from which said insulation coating has been mechanically stripped into a flat shape.

14. The method for manufacturing a stator for an alternator according to claim 1 wherein said coil wires are formed into a general U shape composed of a pair of straight portions separated by a predetermined number of slots being connected by a turn portion having a general V shape.

15. The method for manufacturing a stator for an alternator according to claim 1 wherein said coil wires are formed into a wave-shaped continuous wire in which straight portions are arranged at a predetermined slot pitch and end portions of adjacent straight portions are connected to each other by generally V-shaped turn portions.

16. The method for manufacturing a stator for an alternator according to claim 1, wherein the cutting of the conductor at the cutting positions is performed after the reduced outer portions of the conductor are formed and the conductor is cut at the reduced outer portion of the conductor.

* * * * *